US012563128B2

(12) United States Patent
Lepeska et al.

(10) Patent No.:  US 12,563,128 B2
(45) Date of Patent:       Feb. 24, 2026

(54) SERVER-MACHINE-DRIVEN HINT GENERATION FOR IMPROVED WEB PAGE LOADING USING CLIENT-MACHINE-DRIVEN FEEDBACK

(71) Applicant: VIASAT, INC., Carlsbad, CA (US)

(72) Inventors: Peter Lepeska, Boston, MA (US); David Lerner, Newton, MA (US)

(73) Assignee: Snappi, Inc., Carlsbad, CA (US)

( * ) Notice: Subject to any disclaimer, the term of this patent is extended or adjusted under 35 U.S.C. 154(b) by 0 days.

(21) Appl. No.: 17/711,882

(22) Filed: Apr. 1, 2022

(65) Prior Publication Data

US 2022/0407939 A1      Dec. 22, 2022

Related U.S. Application Data

(63) Continuation of application No. 17/082,358, filed on Oct. 28, 2020, now Pat. No. 11,310,333, which is a (Continued)

(51) Int. Cl.
*H04L 67/5681* (2022.01)
*G06F 16/957* (2019.01)

(52) U.S. Cl.
CPC ........ *H04L 67/5681* (2022.05); *G06F 16/957* (2019.01)

(58) Field of Classification Search
CPC .................... H04L 43/00; H04L 43/04; H04L 43/06–0811; H04L 43/0876–16;

(Continued)

(56) References Cited

U.S. PATENT DOCUMENTS 5,408,470 A      4/1995  Rothrock et al.
5,485,609 A      1/1996  Vitter et al.
(Continued)

FOREIGN PATENT DOCUMENTS

EP          1 041 497          1/2005
EP          1018085 B1        4/2006
(Continued)

OTHER PUBLICATIONS

B. de la Ossa et al., "Delfos: the Oracle to Predict Next Web User's Accesses," 21st International Conference on Advanced Networking and Applications (AINA '07), DOI: 0-7695-2846-5/07, 2007, in 8 pages.

(Continued)

*Primary Examiner* — Boris D Grijalva Lobos
(74) *Attorney, Agent, or Firm* — GTC Law Group PC & Affiliates

(57) ABSTRACT

Embodiments seek to improve web page loading time using server-machine-driven hint generation for based on client-machine-driven feedback. For example, client computers having page renderers are in communication with content servers and hinting processors. The hinting processors can use hinting feedback from multiple page rendering instances to automatically generate hints for optimizing loading and/or rendering of those pages. In some implementations, in response to page requests from the page renderers, content servers can request hints from hinting processors and send those hints to the requesting page renderers for use in improving the page loading experience. In other implementations, in response to page requests from the page renderers, content servers can instruct the requesting page renderers to contact an appropriate hinting processor and to retrieve appropriate hints therefrom for use in improving the page loading experience.

44 Claims, 10 Drawing Sheets

Related U.S. Application Data continuation of application No. 14/729,949, filed on Jun. 3, 2015, now Pat. No. 10,855,797.

(60) Provisional application No. 62/007,374, filed on Jun. 3, 2014.

(58) Field of Classification Search
CPC ......... H04L 67/00; H04L 67/02; H04L 67/28; H04L 67/2804; H04L 67/2833; H04L 67/30; H04L 67/16; H04L 67/50; H04L 67/56; H04L 67/568; H04L 67/5681; G06F 11/00; G06F 11/30–3024; G06F 11/3048; G06F 13/00; G06F 13/14; G06F 15/00; G06F 15/16
See application file for complete search history.

(56) References Cited

U.S. PATENT DOCUMENTS

| | | | |
|---|---|---|---|
| 5,727,129 A | 3/1998 | Barrett et al. | |
| 5,740,367 A | 4/1998 | Spilo | |
| 5,870,754 A | 2/1999 | Dimitrova et al. | |
| 5,878,223 A | 3/1999 | Becker et al. | |
| 5,905,981 A | 5/1999 | Lawler | |
| 6,055,569 A | 4/2000 | O'Brien et al. | |
| 6,085,193 A * | 7/2000 | Malkin ............... H04L 67/5681 |
| | | | 709/200 |
| 6,085,226 A | 7/2000 | Horvitz | |
| 6,178,461 B1 | 1/2001 | Chan et al. | |
| 6,182,133 B1 | 1/2001 | Horvitz | |
| 6,253,264 B1 | 6/2001 | Sebastian | |
| 6,339,787 B1 | 1/2002 | Yohe et al. | |
| 6,453,389 B1 | 9/2002 | Weinberger et al. | |
| 6,463,508 B1 | 10/2002 | Wolf et al. | |
| 6,578,073 B1 | 6/2003 | Starnes et al. | |
| 6,622,168 B1 * | 9/2003 | Datta .................. H04L 67/5682 |
| | | | 709/219 |
| 6,701,316 B1 | 3/2004 | Li et al. | |
| 6,721,780 B1 | 4/2004 | Kasriel et al. | |
| 6,879,808 B1 | 4/2005 | Nations et al. | |
| 6,993,591 B1 | 1/2006 | Klemm | |
| 7,113,935 B2 | 9/2006 | Saxena | |
| 7,124,305 B2 | 10/2006 | Margolus et al. | |
| 7,130,890 B1 | 10/2006 | Kumar et al. | |
| 7,237,061 B1 | 6/2007 | Boic | |
| 7,340,510 B1 | 3/2008 | Liskov et al. | |
| 7,343,397 B2 | 3/2008 | Kochanski | |
| 7,359,956 B2 | 4/2008 | Kanai et al. | |
| 7,363,291 B1 | 4/2008 | Page | |
| 7,418,494 B2 | 8/2008 | Dahlin et al. | |
| 7,430,331 B2 | 9/2008 | Singh | |
| 7,509,667 B1 | 3/2009 | Cook | |
| 7,526,607 B1 | 4/2009 | Singh et al. | |
| 7,548,947 B2 | 6/2009 | Kasriel et al. | |
| 7,636,767 B2 | 12/2009 | Lev-Ran et al. | |
| 7,680,897 B1 | 3/2010 | Carter et al. | |
| 7,681,032 B2 | 3/2010 | Peled et al. | |
| 7,716,225 B1 | 5/2010 | Dean et al. | |
| 7,716,332 B1 | 5/2010 | Topfl et al. | |
| 7,716,367 B1 | 5/2010 | Leighton et al. | |
| 7,747,749 B1 | 6/2010 | Erikson et al. | |
| 7,778,438 B2 | 8/2010 | Malone | |
| 7,814,149 B1 | 10/2010 | Stringham | |
| 7,836,177 B2 | 11/2010 | Kasriel et al. | |
| 7,917,531 B2 | 3/2011 | Sakurai et al. | |
| 7,941,409 B2 | 5/2011 | Mimatsu | |
| 7,941,609 B2 | 5/2011 | Almog | |
| 7,953,881 B1 | 5/2011 | Vadlakonda et al. | |
| 7,975,019 B1 | 7/2011 | Green et al. | |
| 7,975,025 B1 | 7/2011 | Szabo et al. | |
| 7,975,071 B2 | 7/2011 | Ramjee et al. | |
| 8,010,705 B1 | 8/2011 | Sebastian et al. | |
| 8,041,677 B2 | 10/2011 | Sumner et al. | |
| 8,055,616 B2 | 11/2011 | Johnston et al. | |
| 8,082,228 B2 | 12/2011 | Mu | |
| 8,136,089 B2 | 3/2012 | Snodgrass et al. | |
| 8,151,004 B1 | 4/2012 | Ufimtsev et al. | |
| 8,209,510 B1 | 6/2012 | Thathapudi et al. | |
| 8,224,964 B1 | 7/2012 | Fredrickson et al. | |
| 8,230,059 B1 | 7/2012 | Santos et al. | |
| 8,230,461 B2 | 7/2012 | Ledermann et al. | |
| 8,284,773 B1 | 10/2012 | Woleben et al. | |
| 8,327,440 B2 | 12/2012 | Milener et al. | |
| 8,335,838 B2 | 12/2012 | Zhang et al. | |
| 8,341,245 B1 | 12/2012 | Roskind et al. | |
| 8,352,318 B2 | 1/2013 | Rikhtverchik et al. | |
| 8,381,213 B1 | 2/2013 | Naamad et al. | |
| 8,423,889 B1 | 4/2013 | Zagorie et al. | |
| 8,477,635 B2 | 7/2013 | Sebastian et al. | |
| 8,478,843 B1 | 7/2013 | Ortlieb et al. | |
| 8,489,672 B2 | 7/2013 | Sebastian et al. | |
| 8,489,673 B2 | 7/2013 | Sebastian et al. | |
| 8,566,788 B2 | 10/2013 | Snodgrass et al. | |
| 8,612,374 B1 | 12/2013 | Amdahl et al. | |
| 8,812,648 B2 | 8/2014 | Subramanian et al. | |
| 8,984,048 B1 | 3/2015 | Maniscalco et al. | |
| 9,037,638 B1 | 5/2015 | Lepeska et al. | |
| 9,083,583 B1 | 7/2015 | Roskind et al. | |
| 9,083,584 B2 | 7/2015 | Lee | |
| 9,106,607 B1 | 8/2015 | Lepeska et al. | |
| 9,117,002 B1 * | 8/2015 | Jenkins ................ G06F 16/957 |
| 9,135,364 B1 | 9/2015 | Sundaram et al. | |
| 9,231,949 B1 | 1/2016 | Jenkins et al. | |
| 9,239,862 B2 | 1/2016 | Mizrotsky et al. | |
| 9,456,050 B1 | 9/2016 | Lepeska et al. | |
| 9,460,229 B2 | 10/2016 | Lepeska et al. | |
| 9,524,287 B2 | 12/2016 | Davis et al. | |
| 9,613,158 B1 | 4/2017 | Lepeska | |
| 9,654,575 B1 | 5/2017 | Sullivan et al. | |
| 9,747,386 B1 * | 8/2017 | Jenkins ............... G06F 16/9574 |
| 9,787,551 B2 | 10/2017 | Newton et al. | |
| 9,817,800 B2 | 11/2017 | Lee et al. | |
| 9,819,554 B2 | 11/2017 | Varney et al. | |
| 9,847,917 B2 | 12/2017 | Varney et al. | |
| 9,887,885 B2 | 2/2018 | Varney et al. | |
| 9,898,445 B2 | 2/2018 | Reshadi et al. | |
| 9,912,718 B1 | 3/2018 | Lepeska et al. | |
| 10,171,550 B1 | 1/2019 | Lepeska et al. | |
| 10,372,780 B1 | 8/2019 | Lepeska et al. | |
| 10,387,522 B2 | 8/2019 | Lepeska et al. | |
| 10,491,703 B1 | 11/2019 | Lepeska et al. | |
| 10,855,797 B2 | 12/2020 | Lepeska et al. | |
| 11,176,219 B1 | 11/2021 | Lepeska et al. | |
| 11,176,223 B1 | 11/2021 | Hill | |
| 11,310,333 B2 | 4/2022 | Lepeska et al. | |
| 2001/0016836 A1 | 8/2001 | Boccon-Gibod et al. | |
| 2001/0043600 A1 | 11/2001 | Chatterjee et al. | |
| 2001/0047517 A1 | 11/2001 | Christopoulos et al. | |
| 2001/0051927 A1 | 12/2001 | London et al. | |
| 2002/0006116 A1 | 1/2002 | Burkhart | |
| 2002/0010761 A1 | 1/2002 | Carneal et al. | |
| 2002/0026478 A1 | 2/2002 | Rodgers et al. | |
| 2002/0154887 A1 | 10/2002 | Lu | |
| 2002/0188735 A1 | 12/2002 | Needham et al. | |
| 2002/0194473 A1 | 12/2002 | Pope et al. | |
| 2003/0018581 A1 | 1/2003 | Bratton et al. | |
| 2003/0105833 A1 | 6/2003 | Daniels et al. | |
| 2003/0120658 A1 | 6/2003 | Carneal et al. | |
| 2003/0126232 A1 | 7/2003 | Mogul et al. | |
| 2003/0237053 A1 | 12/2003 | Chen et al. | |
| 2004/0064577 A1 | 4/2004 | Dahlin et al. | |
| 2004/0205149 A1 | 10/2004 | Dillon et al. | |
| 2005/0010870 A1 | 1/2005 | Gu et al. | |
| 2005/0015387 A1 | 1/2005 | Sassi et al. | |
| 2005/0015442 A1 | 1/2005 | Olaughlen et al. | |
| 2005/0027820 A1 | 2/2005 | Olaughlen et al. | |
| 2005/0033747 A1 | 2/2005 | Wittkotter | |
| 2005/0044242 A1 | 2/2005 | Stevens et al. | |
| 2005/0131903 A1 | 6/2005 | Margolus et al. | |
| 2005/0154781 A1 | 7/2005 | Carlson et al. | |
| 2005/0193096 A1 | 9/2005 | Yu et al. | |
| 2006/0047804 A1 | 3/2006 | Fredricksen et al. | |
| 2006/0075068 A1 | 4/2006 | Kasriel et al. | |

(56) References Cited

U.S. PATENT DOCUMENTS

| | | | |
|---|---|---|---|
| 2006/0101514 A1 | 5/2006 | Milener et al. | |
| 2006/0112264 A1 | 5/2006 | Agarwal | |
| 2006/0116926 A1 | 6/2006 | Chen | |
| 2006/0149826 A1 | 7/2006 | Rooney | |
| 2006/0184960 A1 | 8/2006 | Horton et al. | |
| 2006/0253444 A1 | 11/2006 | Otoole et al. | |
| 2006/0277257 A1 | 12/2006 | Kromann et al. | |
| 2006/0288072 A1 | 12/2006 | Knapp et al. | |
| 2006/0294112 A1 | 12/2006 | Mandato et al. | |
| 2006/0294223 A1 | 12/2006 | Glasgow et al. | |
| 2007/0033408 A1 | 2/2007 | Morten | |
| 2007/0101074 A1 | 5/2007 | Patterson | |
| 2007/0111713 A1 | 5/2007 | Silverbrook et al. | |
| 2007/0116151 A1 | 5/2007 | Thesling | |
| 2007/0133554 A1 | 6/2007 | Ederer et al. | |
| 2007/0143484 A1 | 6/2007 | Drouet et al. | |
| 2007/0156845 A1 | 7/2007 | Devanneaux et al. | |
| 2007/0174246 A1 | 7/2007 | Sigurdsson et al. | |
| 2007/0220303 A1 | 9/2007 | Kimura et al. | |
| 2007/0226320 A1 | 9/2007 | Hager et al. | |
| 2007/0256021 A1 | 11/2007 | Prager et al. | |
| 2007/0260653 A1 | 11/2007 | Jaffri et al. | |
| 2007/0288518 A1 | 12/2007 | Crigler et al. | |
| 2008/0005086 A1 | 1/2008 | Moore | |
| 2008/0066182 A1 | 3/2008 | Hickmott et al. | |
| 2008/0082509 A1 | 4/2008 | Bessieres et al. | |
| 2008/0091711 A1 | 4/2008 | Snodgrass et al. | |
| 2008/0114773 A1 | 5/2008 | Choi et al. | |
| 2008/0115125 A1 | 5/2008 | Stafford et al. | |
| 2008/0144713 A1 | 6/2008 | Kimmich et al. | |
| 2008/0155614 A1 | 6/2008 | Cooper et al. | |
| 2008/0175239 A1 | 7/2008 | Sistanizadeh et al. | |
| 2008/0201331 A1 | 8/2008 | Eriksen et al. | |
| 2008/0201332 A1 | 8/2008 | Souders et al. | |
| 2008/0205396 A1 | 8/2008 | Dakshinamoorthy et al. | |
| 2008/0229021 A1 | 9/2008 | Plamondon | |
| 2008/0235594 A1 | 9/2008 | Bhumkar et al. | |
| 2008/0235739 A1 | 9/2008 | Coebergh | |
| 2008/0256138 A1 | 10/2008 | Sim-Tang | |
| 2008/0263130 A1 | 10/2008 | Michalowitz et al. | |
| 2009/0006368 A1 | 1/2009 | Mei et al. | |
| 2009/0019153 A1 | 1/2009 | Sebastian | |
| 2009/0037393 A1 | 2/2009 | Fredricksen et al. | |
| 2009/0047937 A1 | 2/2009 | Zellner et al. | |
| 2009/0049469 A1 | 2/2009 | Small et al. | |
| 2009/0055471 A1 | 2/2009 | Kozat et al. | |
| 2009/0055862 A1 | 2/2009 | Knoller et al. | |
| 2009/0060086 A1 | 3/2009 | Kimmich et al. | |
| 2009/0083155 A1* | 3/2009 | Tudor | G06Q 10/06 |
| | | | 709/224 |
| 2009/0100228 A1 | 4/2009 | Lepeska et al. | |
| 2009/0112975 A1 | 4/2009 | Beckman et al. | |
| 2009/0158318 A1 | 6/2009 | Levy | |
| 2009/0168795 A1 | 7/2009 | Segel | |
| 2009/0187673 A1 | 7/2009 | Ramjee et al. | |
| 2009/0228782 A1 | 9/2009 | Fraser | |
| 2009/0234809 A1 | 9/2009 | Bluger et al. | |
| 2009/0276488 A1 | 11/2009 | Alstad | |
| 2009/0313329 A1 | 12/2009 | Agrawal et al. | |
| 2010/0017696 A1 | 1/2010 | Choudhary et al. | |
| 2010/0058430 A1 | 3/2010 | Jones et al. | |
| 2010/0083322 A1 | 4/2010 | Rouse | |
| 2010/0095220 A1 | 4/2010 | Kassab | |
| 2010/0146415 A1 | 6/2010 | Lepeska | |
| 2010/0169262 A1 | 7/2010 | Kenedy et al. | |
| 2010/0169313 A1 | 7/2010 | Kenedy et al. | |
| 2010/0169457 A1* | 7/2010 | Kinoshita | G06F 16/958 |
| | | | 709/219 |
| 2010/0177642 A1 | 7/2010 | Sebastian et al. | |
| 2010/0179984 A1 | 7/2010 | Sebastian | |
| 2010/0179986 A1 | 7/2010 | Sebastian et al. | |
| 2010/0179987 A1 | 7/2010 | Sebastian et al. | |
| 2010/0180046 A1 | 7/2010 | Sebastian et al. | |
| 2010/0185730 A1 | 7/2010 | Sebastian | |
| 2010/0191856 A1 | 7/2010 | Gupta et al. | |
| 2010/0228963 A1 | 9/2010 | Kassab et al. | |
| 2010/0232431 A1 | 9/2010 | Sebastian | |
| 2010/0235579 A1 | 9/2010 | Biles et al. | |
| 2010/0250341 A1* | 9/2010 | Hauser | H04L 67/02 |
| | | | 707/E17.042 |
| 2010/0312858 A1 | 12/2010 | Mickens et al. | |
| 2011/0029641 A1 | 2/2011 | Fainberg et al. | |
| 2011/0078124 A1 | 3/2011 | Ushiyama | |
| 2011/0238924 A1 | 9/2011 | Hampton et al. | |
| 2011/0246880 A1 | 10/2011 | Horton et al. | |
| 2011/0258532 A1 | 10/2011 | Ceze et al. | |
| 2011/0270959 A1 | 11/2011 | Schlusser et al. | |
| 2011/0295979 A1 | 12/2011 | Alstad et al. | |
| 2012/0030337 A1* | 2/2012 | Bang | H04W 4/50 |
| | | | 709/223 |
| 2012/0060121 A1 | 3/2012 | Goldberg et al. | |
| 2012/0066586 A1 | 3/2012 | Shemesh | |
| 2012/0084516 A1 | 4/2012 | Iwuchukwu | |
| 2012/0110469 A1* | 5/2012 | Magarshak | H04L 63/0421 |
| | | | 715/747 |
| 2012/0136926 A1 | 5/2012 | Dillon | |
| 2012/0185505 A1 | 7/2012 | Borden et al. | |
| 2012/0239598 A1 | 9/2012 | Cascaval et al. | |
| 2013/0031459 A1 | 1/2013 | Khorashadi et al. | |
| 2013/0166634 A1 | 6/2013 | Holland | |
| 2013/0226837 A1 | 8/2013 | Lymberopoulos et al. | |
| 2013/0226992 A1 | 8/2013 | Bapst et al. | |
| 2013/0297561 A1 | 11/2013 | Mizrotsky et al. | |
| 2014/0108503 A1 | 4/2014 | Haykal et al. | |
| 2014/0149850 A1 | 5/2014 | Khorashadi et al. | |
| 2014/0279851 A1 | 9/2014 | Rangarajan et al. | |
| 2014/0365865 A1* | 12/2014 | Ivory | G06F 40/143 |
| | | | 715/234 |
| 2015/0156194 A1 | 6/2015 | Modi et al. | |
| 2015/0186545 A1* | 7/2015 | Krutzler | G06F 3/04883 |
| | | | 715/234 |
| 2015/0242379 A1* | 8/2015 | Kuivinen | G06F 40/143 |
| | | | 715/234 |
| 2015/0271287 A1 | 9/2015 | Islam et al. | |
| 2015/0304384 A1 | 10/2015 | Lee | |
| 2015/0350370 A1 | 12/2015 | Lepeska et al. | |
| 2018/0246982 A1 | 8/2018 | Lepeska et al. | |
| 2018/0337972 A1 | 11/2018 | Lepeska et al. | |
| 2020/0097514 A1 | 3/2020 | Lepeska et al. | |
| 2021/0044669 A1 | 2/2021 | Lepeska et al. | |

FOREIGN PATENT DOCUMENTS

| | | | |
|---|---|---|---|
| WO | 0161886 A2 | 8/2001 | |
| WO | 0184777 A2 | 11/2001 | |
| WO | 0241527 A1 | 5/2002 | |
| WO | 2007051079 A2 | 5/2007 | |
| WO | 2008070614 A2 | 6/2008 | |
| WO | 2010081160 A2 | 7/2010 | |
| WO | 2017069735 A1 | 4/2017 | |

OTHER PUBLICATIONS

"Alnuem, "An Extended Review of Techniques for Enhancing TCP Performance", J_ King Saud University, vol. 22, Comp. & Info. Sci., 2010, pp. 45-61".

Frantzeskou , et al., ""Effective Identification of Source Code Authors Using Byte-Level Information" May 2006, pp. 893-896", Proceedings o he 28th International Conference on Software Engineering, vol. 1, May 2006, pp. 893-896.

Grigorik, Ilya , "Chrome Networking: DNS Prefetch & TCP Preconnect", Jun. 4, 2012, 5pgs.

Grigorik, Ilya , "Eliminating Roundtrips with Preconnect", https://www.igvita.com/2015/08/17/eliminating-roundtrips-with-preconnect, Aug. 17, 2015, 4 pgs.

Grigorik, Ilya , "High Performance Networking in Google Chrome", https://www.igvita.com/posa/high-performance-networking-in-google-chrome, Jan. 31, 2013, 20 pgs.

Grigorik , et al., "Resource Hints, W3C First Public Working Draft", https://wwww3.org/TR/2014/WD-resource-hints-20141021, Oct. 21, 2014, 10 pgs.

(56) References Cited

OTHER PUBLICATIONS

Grigorik , et al., "Resource Hints," W3C Working Draft, https://www.w3.org/TR/2016/WD-resource-hints-20160225, Feb. 25, 2016, 13 pgs.

Markham , "Mouseover Prefetch? Hacking for Christ", Available Online at: https://blog.gerv.nel/2009/05/mouseover_prefetch/, May 27, 2009, pp. 1-10.

Paul , et al., "Distributed Caching with Centralized Control", Computer Communications, vol. 24, Issue 2, Feb. 1, 2001, 1-13.

Selvakumar , et al., "Implementation and Comparison of Distributed Caching Schemes", Computer Communications, vol. 24, Issues 7-8, Apr. 1, 2001, pp. 677-684.

Souders, Steve , "Prebrowsing", https://www.stevesouders.com/blog/2013/11/07/prebrowsing, Nov. 7, 2013, 8 pgs.

Walsh , "HTML5 Link Prefetching", DWB, 7/72010.

\* cited by examiner

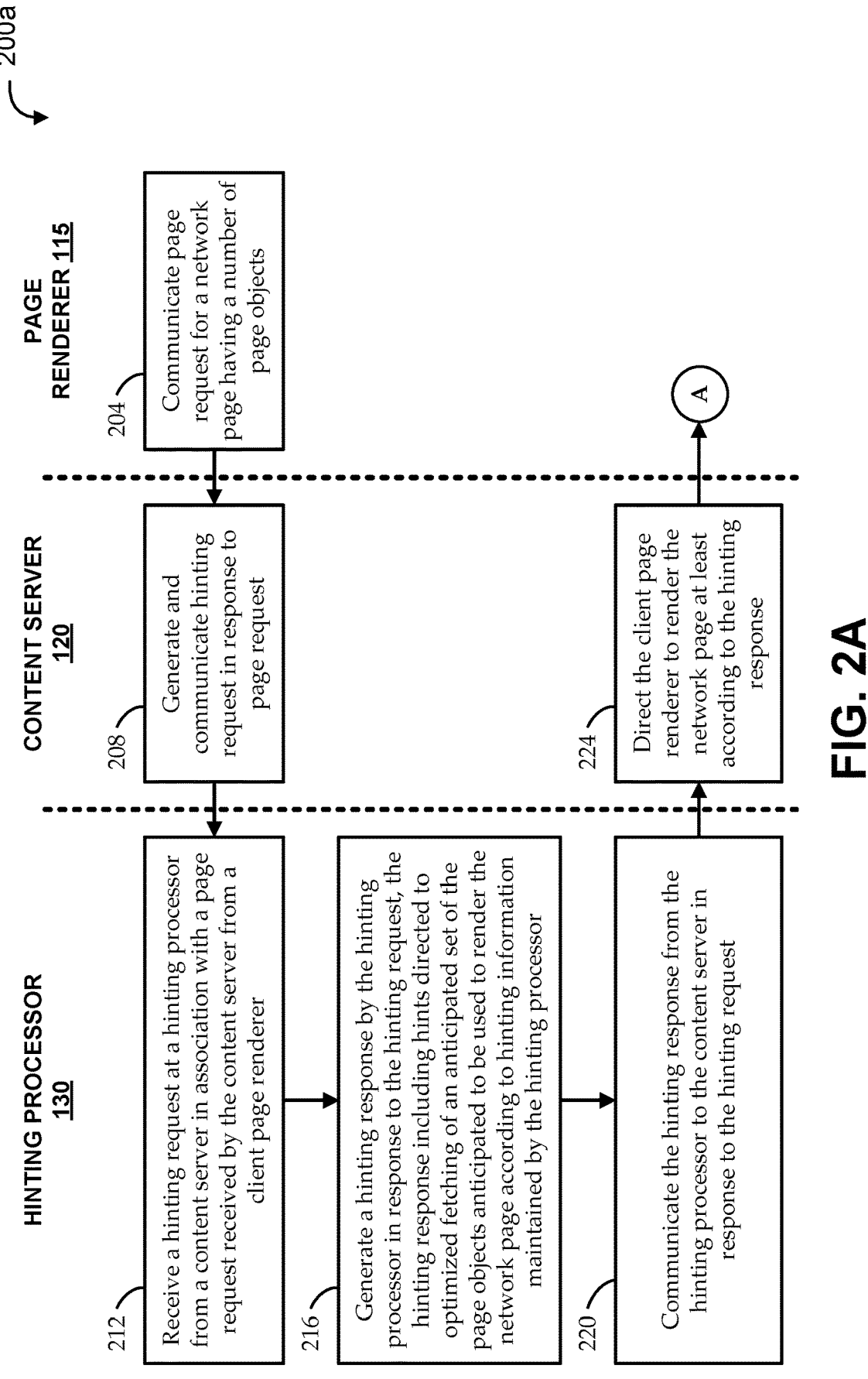

PAGE RENDERER 115

204 — Communicate page request for a network page having a number of page objects

CONTENT SERVER 120

208 — Generate and communicate hinting request in response to page request

224 — Direct the client page renderer to render the network page at least according to the hinting response

Ⓐ

HINTING PROCESSOR 130

212 — Receive a hinting request at a hinting processor from a content server in association with a page request received by the content server from a client page renderer 216 — Generate a hinting response by the hinting processor in response to the hinting request, the hinting response including hints directed to optimized fetching of an anticipated set of the page objects anticipated to be used to render the network page according to hinting information maintained by the hinting processor 220 — Communicate the hinting response from the hinting processor to the content server in response to the hinting request

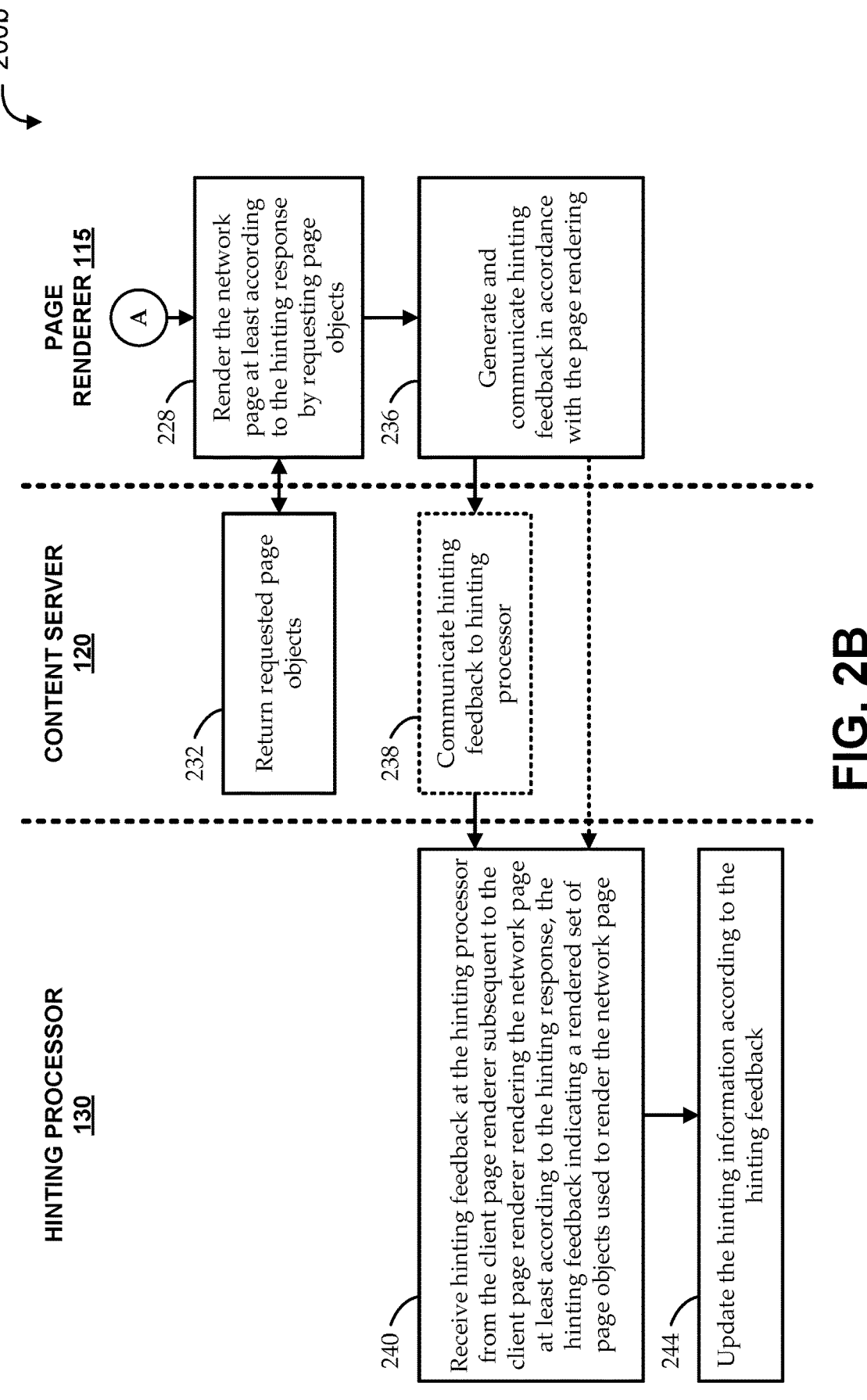

PAGE RENDERER 115

228 Render the network page at least according to the hinting response by requesting page objects

A

236 Generate and communicate hinting feedback in accordance with the page rendering

CONTENT SERVER 120

232 Return requested page objects

238 Communicate hinting feedback to hinting processor

HINTING PROCESSOR 130

240 Receive hinting feedback at the hinting processor from the client page renderer subsequent to the client page renderer rendering the network page at least according to the hinting response, the hinting feedback indicating a rendered set of page objects used to render the network page 244 Update the hinting information according to the hinting feedback

FIG. 2B

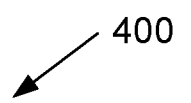

400

```
┌─────────────────┐
│  Rendered Web   │
│  Page Output    │
│      422        │
└─────────────────┘
         ▲
         │
┌─────────────────┐          ┌─────────────────┐
│   Look ahead    │          │  Renderer 420   │
│      432a       │          └─────────────────┘
└─────────────────┘            ▲   ▲   ▲
         ▲                     │   │   │
         │                     ▼   ▼   ▼
┌─────────────────┐          ┌─────────────────┐
│   Parser 430    │◄─────────│ Control Module  │
│                 │─────────►│      410        │
└─────────────────┘          └─────────────────┘
```

Look ahead 432a

Parser 430

Renderer 420

Control Module 410

Hint Prefetch 450b

Hint Memory 490

Hints 480

Script Executer 460

Cache 470

ObjectFetcher 440

Render Request 442

Look ahead 432b

Hint Prefetch 450a

FIG. 4

Figure 8:
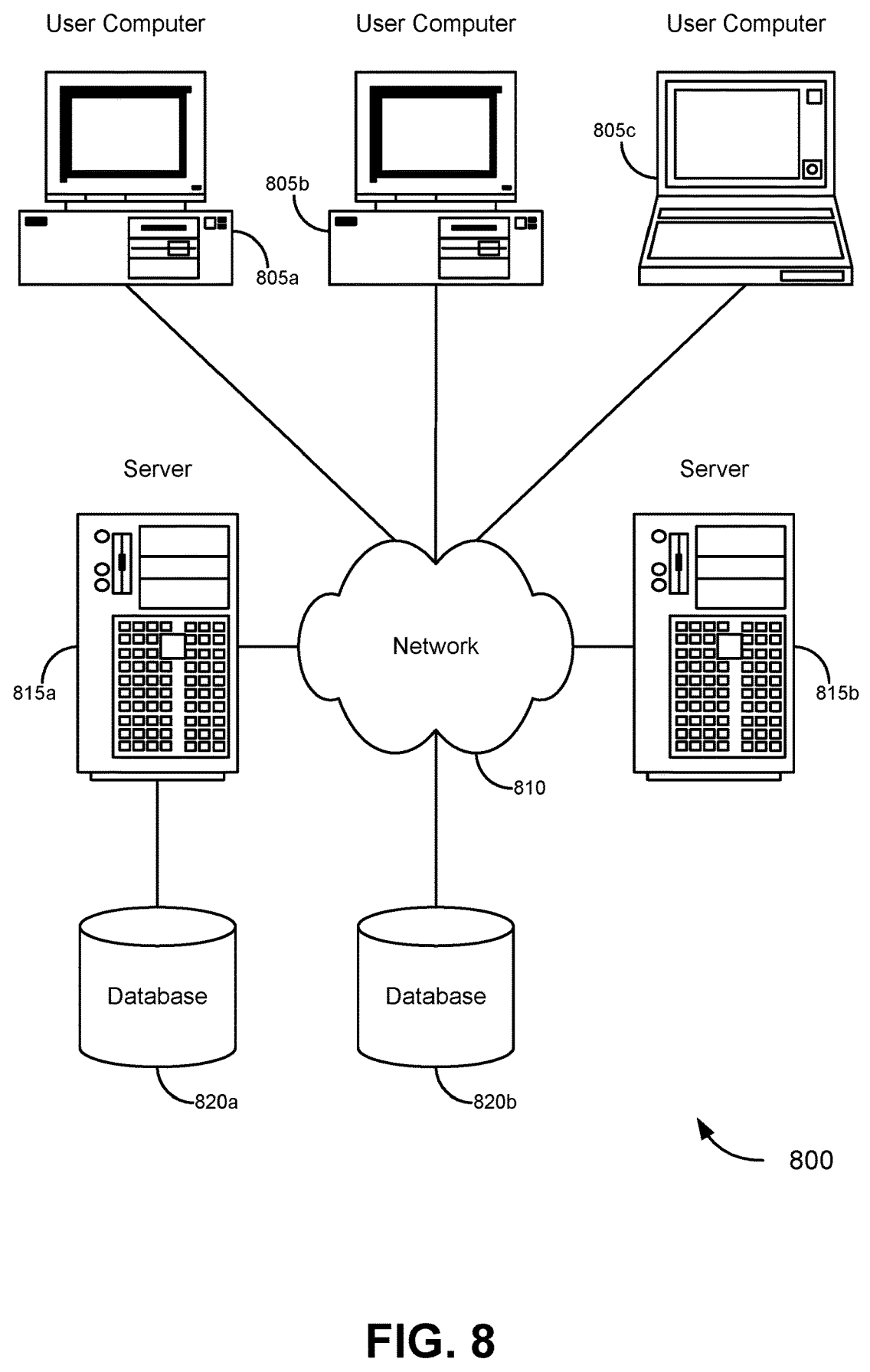

User Computer

User Computer

User Computer

805c

805b

805a

Server

Server

815a

Network

815b

810

Database

Database

SERVER-MACHINE-DRIVEN HINT GENERATION FOR IMPROVED WEB PAGE LOADING USING CLIENT-MACHINE-DRIVEN FEEDBACK

CROSS-REFERENCE TO RELATED APPLICATIONS

This application is a continuation of U.S. patent application Ser. No. 17/082,358, filed Oct. 28, 2020, titled "Server-Machine-Driven Hint Generation for Improved Web Page Loading Using Client-Machine-Driven Feedback," which is a continuation of U.S. patent application Ser. No. 14/729, 949, filed Jun. 3, 2015, titled "Server-Machine-Driven Hint Generation for Improved Web Page Loading Using Client-Machine-Driven Feedback," and U.S. Patent Application No. 62/007,374, filed Jun. 3, 2014, titled "Server Based Embedded Web Page Feedback and Performance Improvement," the entireties of both of which are hereby incorporated by reference.

FIELD

Embodiments relate generally to client-server network communications performance, and, more particularly, to improving web page loading time using server-machine-driven hint generation based on client-machine-driven feedback.

BACKGROUND

Web page transmission, in which a user selects web page content and receives objects, is a core part of the Internet experience for Internet users. While the experience of users is typically a single selection followed by the viewing of a web page that is presented on the screen, the process of presenting the web page on the screen can involve a large number of objects and multiple request/response round-trip communications from the user system to one or more web servers that are providing objects for the web page. Additionally, each object may be associated with a number of different phases as part of the inclusion of the object in a web page that is presented to a user. Each object that is part of a web page and each phase associated with each object may contribute to an overall page load time that is experienced by a device user as delay

SUMMARY

Among other things, systems and methods are described for improving web page loading time using server-machine-driven hint generation based on client-machine-driven feedback. Some embodiments operate in context of client computers having page renderers in communication, over a communications network, with content servers and hinting processors. The hinting processors use hinting feedback from rendering of web pages by the page renderers to automatically generate and/or refine machine-learning-based hint models for optimizing the rendering (e.g., loading and outputting) of those web pages. Instead of the hinting processors being in persistent communication with the client computers and/or otherwise monitoring the client computers' behavior over many page transactions (e.g., across multiple content servers), the hinting processor behavior can be driven by the content server. In some implementations, in response to page requests from the page renderers, content servers can request hints from hinting processors and send those hints to the requesting page renderers for use in improving the page loading experience. In other implementations, in response to page requests from the page renderers, content servers can instruct the requesting page renderers to contact an appropriate hinting processor and to retrieve appropriate hints therefrom for use in improving the page loading experience.

According to one set of embodiments, a method is provided for improving web page loading time in a communications network. The method includes: receiving a hinting request at a hinting processor from a content server in association with a page request received by the content server from a client page renderer, the page request being for a web page having a number of page objects; generating a hinting response by the hinting processor in response to the hinting request, the hinting response including hints directed to optimized fetching of an anticipated set of the page objects anticipated to be used to render the web page according to hinting information maintained by the hinting processor; communicating the hinting response from the hinting processor to the content server in response to the hinting request, thereby causing the content server to direct the client page renderer to render the web page at least according to the hinting response; receiving hinting feedback at the hinting processor from the client page renderer subsequent to the client page renderer rendering the web page at least according to the hinting response, the hinting feedback indicating a rendered set of page objects used to render the web page; and updating the hinting information according to the hinting feedback.

According to another set of embodiments, another method is provided for improving web page loading time in a communications network. The method includes: receiving a hinting request at a hinting processor from a client page renderer in response to the client page renderer executing a hinting script that identifies a network location of the hinting processor, the hinting script communicated to the client page renderer by a content server in response to the client page renderer communicating a page request to the content server for a web page having a number of page objects; generating a hinting response by the hinting processor in response to the hinting request, the hinting response including hints directed to optimized fetching of an anticipated set of the page objects anticipated to be used to render the web page according to hinting information maintained by the hinting processor; communicating the hinting response from the hinting processor to the client page renderer in response to the hinting request, thereby causing the client page renderer to render the web page at least according to the hinting response; receiving hinting feedback at the hinting processor from the client page renderer subsequent to the client page renderer rendering the web page at least according to the hinting response, the hinting feedback indicating a rendered set of page objects used to render the web page; and updating the hinting information according to the hinting feedback.

According to another set of embodiments, another method is provided for improving web page loading time in a communications network. The method includes: first communicating, from a client page renderer to a content server over a communications network, a page request for a web page having a number of page objects; receiving a page response at the client page renderer from the content server over the communications network in response to the page request, the page response having a first page object and a hinting script; second communicating, by the client page renderer in response to executing the hinting script, a number of object requests for the page objects, at least a portion of the object requests indicating an anticipated set of the page objects used to render the web page as defined by a hinting processor associated with the hinting script; rendering the web page by the client page renderer by receiving the page objects from the content server in response to the object requests; monitoring hinting feedback indicating a set of rendered page objects used to render the web page; and third communicating the hinting feedback from the client page renderer to the hinting processor

BRIEF DESCRIPTION OF THE DRAWINGS

The present disclosure is described in conjunction with the appended figures:

FIGS. 2A and 2B show a flow diagram of an illustrative method for improving web page loading, according to some embodiments;

FIG. 4 shows an illustrative page renderer for use with various embodiments;

FIG. 8 illustrates a block diagram of one implementation of a communications system that may be used with different aspects of various embodiments presented herein.

Figure 1:
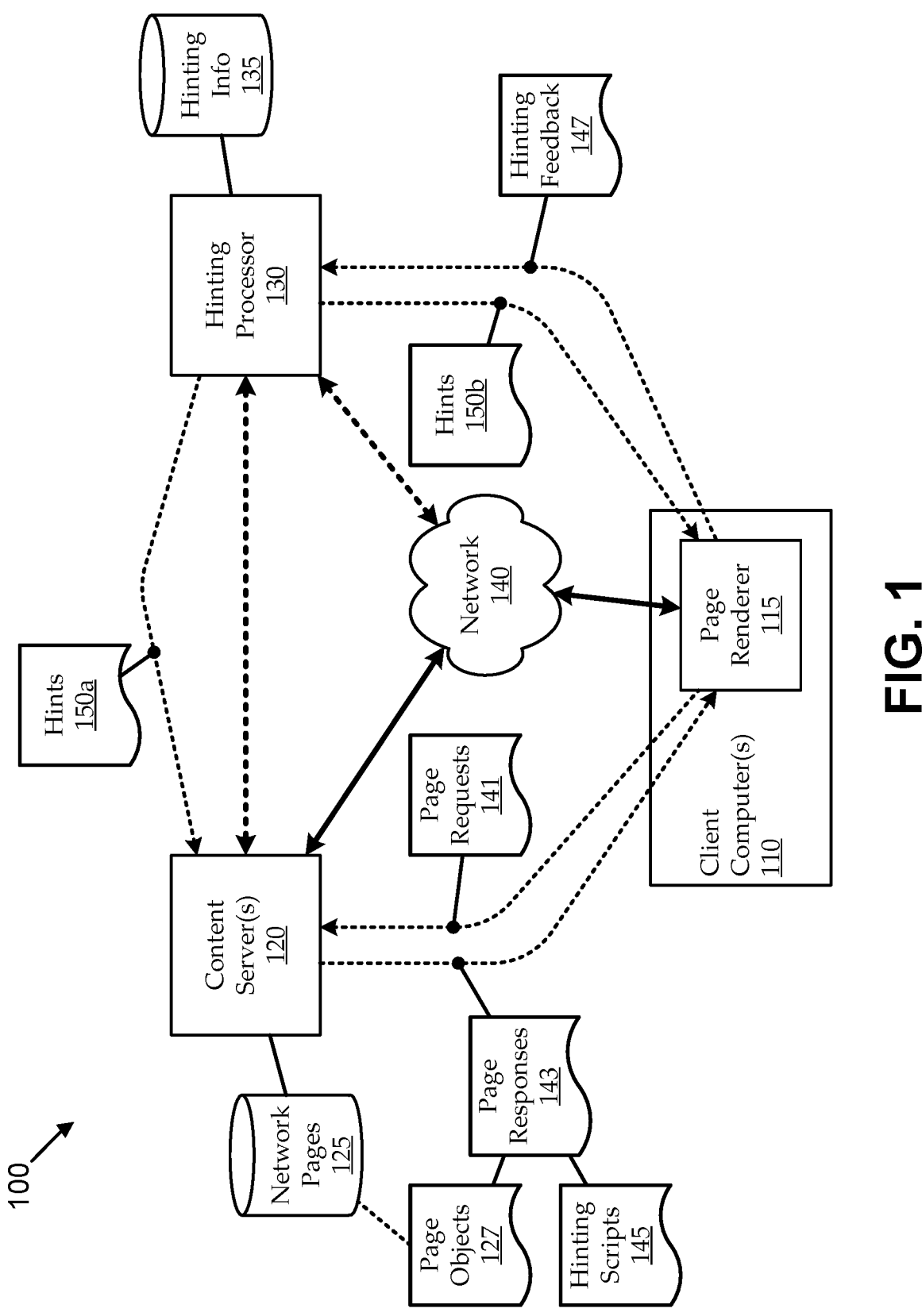
FIG. 1 shows an illustrative communications system environment that provides a context for various embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Embodiments described herein seek to improve web page loading time (and, thereby, end user experience) using server-machine-driven hint generation based on client-machine-driven feedback. For example, a feedback script or other client-machine-driven technique may be used to generate feedback information on the actual page rendering process that occurs in a web browser. The feedback information may then be used to update a machine-learning driven hinting model, which can be used to generate hints.

The hints can be provided via scripts, embedded in web page code, as part of a web page header, and/or in any other suitable manner.

As used herein "web page transaction" refers to a communication between a client computer and a server computer to transfer a plurality of objects to the client computer which may be presented to the user as part of a web page. As used herein, a "web page" is intended to broadly refer to any type of page sent over a communications network and consisting of multiple page objects. For example, the web page can be a typical web page used in World Wide Web communications, a page (e.g., screen) of an application (e.g., an app, etc.), or any other type of web page. Further, reference to "web" is not intended to be limited to the Internet or the World Wide Web; rather, the "web" can include any public or private communications network. Further, the term "page renderer," as used herein, is not intended to be limited to any particular process in a web browser; rather "page renderer" can refer to any process or set of processes used to load and/or render an end-user experience of a web page and its page objects in a browser or other application (i.e., "render" and "load" are used herein to generally express formulating the page using the page objects). In one example, the web pages can include web browser pages; the page renderer can include a web browser; and the page objects can include uniform resource locators (URLs), hypertext markup language (HTML) objects, scripts, and/or other server-side objects used (e.g., needed in some or all instances) by the web browser to render the web pages. In another example, the web pages can include screens of an app (e.g., or any other application); the page renderer can include the app (e.g., the portion of the app that handles input/output interactions); and the page objects can be the audiovisual content of the rendered screens.

For example, in one embodiment, a web server computer (e.g., or other content server) may inject a feedback script into the initial response to a client computer's request for the web page. At a browser of the client computer, the feedback script may then gather information related to the web page transaction. Alternatively, the page renderer (e.g., browser) can be designed to automatically gather the information related to the web page transaction. This information may include a list of all objects requested as part of the transaction, a list of objects needed to present an initial incomplete web page on an output of a client device, a set of cookies (and/or hashed versions of those cookies) associated with the client device or processing operating on the client device, a set of cookies (and/or hashed versions of those cookies) associated with one or more web page objects or client processes, a set of timings associated with each object, a set of timings associated with the overall page rendering process, a set of relationships between the objects, details associated with cached objects, object sizes, object types, object fingerprints or checksums, object position on the page, cookie meta-data, redirect chains, alternative content sources user during a transaction such as content delivery networks (CDNs) that may be used for some objects, details of the domain name servers (DNS) used during the transaction, secure connection meta-data, and any other such details.

When the page renderer has completed presenting the web page to the user, this feedback information gathered by the feedback script may then be sent to an assistance service operating as part of or in conjunction with the web server computer. The feedback information may be processed either to automatically update the root object, or to generate hints that may be sent along with the root object in a later instance of the web page transaction or a similar transaction. The update to the root object or the hints may enable a page renderer to improve performance (loading time) of the later instance of the web page transaction. This improvement may be realized by lowering an overall time from a user selection to a completed presentation of the page to a user. This improvement may also be realized by lowering an initial time to presentation of an incomplete version of the web page that may be functional for user purposes. In one potential embodiment, a lowering of the overall time may result from the use of latency information in conjunction with other feedback information to determine how aggressively a page renderer will attempt to prefetch child objects as part of future instances of the web page transaction.

Objects used in such a web page may include HTML files, cascaded style sheet (CSS) files, image files, video files, or any other such objects. Reference to different instances of a web page transaction refers to the transaction being performed by different client computer at different times, or the same transaction being performed by a single client computer at different times. These different instances of a web page transaction may include variations in the objects that are part of the web page transaction, either due to customization across different client computers, or updates to the web page over time. Further, different web pages and different web page transactions may include objects that are the same or similar. In certain embodiments, feedback information and hints generated for an object seen in one web page transaction may be applied as hints in a transaction for a separate web page if the root URLs are similar or if there is a sufficient degree of commonality between the sets of objects is used in both web page transactions. Similarly, as used herein, terms, like "render" and "load" are used broadly (and, in most cases, interchangeably) to refer generally to enabling interaction by a user with a page object via a page renderer interface. For example, rendering or loading can include displaying and/or formatting in context of static visual content, playing in context of video or audio content, executing in context of code or other scripts, etc.

Further, as used herein, "root" refers to an initial portion of a web page transaction that is initiated directly by a user selection or action. For example, a user clicking on a web page link initiates a root request for that link. The root response is the response directly responding to that root request. The root response also includes a root object. This root object includes information that enables a page renderer to identify, either directly or indirectly, the other objects needed to render and present the complete web page. In some instances, the "root" object can include a primary child object in an iframe on a page, or the like (e.g., where each of multiple iframes are separately hinted from different content servers).

"Redirect" refers to a response to a root request that directs the requesting client device to a different source for an object. For example, a client device may send a root request and receive back a redirect response. The client device may then send a redirected child request to the redirect target indicated in the redirect response. In certain embodiments, a response to the redirected child request may then include a feedback script or hints. Thus, while certain embodiments describe operation with a root request and response, in various embodiments, any root, child, or redirected response described herein may include a feedback script as described in the various embodiments herein.

"Child" requests and responses are the follow-on requests and responses that result, either directly or indirectly, from embedded or calculated references to other objects in root objects or other child objects. The child objects, requests, and responses are always one or more steps removed from the user action by a root that directly responds to the user action. Child objects may include references to additional child objects, resulting in a chain of requests and responses. Each of the above requests and responses may be hypertext transport protocol (HTTP) requests and responses including HTTP headers and an associated message. In various embodiments, other communication protocols may be used.

As used herein, "feedback information" refers to any information describing a web page transaction that may be captured by a client computer, by a page renderer operating on a client device, by a web server, by a proxy server in a communication path between a client device and a web server, or by any other device involved with a web page transaction. A "hint," "hints," or "hint information" as described herein refers to information that may be provided to a client computer, a page renderer operating on a client computer, or a proxy system involved with a web page transaction that allows optimization of the web page transaction. In certain embodiments, feedback information may be used to create hints. The feedback and related hints may be directed to prefetching objects, downloading objects, object caching, or networking allocations for communications that may be optimized as part of a web page transactions. Examples of hints and feedback information may be found in U.S. patent application Ser. No. 13/372,347 "BROWSER BASED FEEDBACK FOR OPTIMIZED WEB BROWSING," U.S. patent application Ser. No. 14/212,538 "FASTER WEB BROWSING USING HTTP OVER AN AGGREGATED TCP TRANSPORT," and Ser. No. 14/276,936 "CACHE HINTING SYSTEMS", each of which is expressly incorporated by reference for all purposes in this application.

FIG. 1 shows an illustrative communications system environment 100 that provides a context for various embodiments. The communications system environment 100 includes client computer(s) 110, content server(s) 120, and hinting processor(s) 130 in communication over a communications network 140. Network 140 can include any one or more suitable communications networks and/or communications links, including any wide area network (WAN), local area network (LAN), private network, public network (e.g., the Internet), wired network, wireless network, etc. Typically, the communications system environment 100 can include many client computers 110 interfacing with multiple content servers 120 over the communications network 140.

As described herein, according to various embodiments, the content servers 120 can be in communication with one or more hinting processors 130 directly and/or via the communications network 140, and/or the client computers 110 can be in communication with the hinting processors 130 via the communications network 140 (e.g., at the direction of the content servers). Some embodiments are directed to improving the loading and rendering of page objects that make up web pages, screens of applications, and/or other similar web page contexts. In such a context, it may be typical for a client computer 110 to make a request for a web page that is provided (e.g., hosted) by a content server 120. Loading and rendering the requested web page can involve subsequently requesting and receiving a number (sometimes a large number) of page objects that make up the web page (e.g., visual content, audio content, executable scripts, etc.). Loading and rendering of such a web page can be improved by requesting objects at particular times (e.g., by prefetching objects in a particular order, etc.), and the client computer can be instructed as to such improvements using "hints," as described herein. The web objects may be identified in the set of hints by URL, by a combination of URL and regular expression, by a script, or by other similar techniques. Loading and rendering of such a web page can also be improved by hints that support pre-resolving domain names, pre-establishing TCP connections, pre-establishing secure connections, predetermining and minimizing the redirect chain and similar functions that can be performed prior to content load that improve overall page load performance. Additionally, the probability that an object will be needed and the priority it should be given by the browser may be communicated to further improve page load time. Additionally, the various image, video and document formats that may be associated with a given object may be sent to the device in advance as hints, thereby allowing the renderer to dynamically adjust to network conditions and constraints and minimize data traffic associated with pre-fetched objects. Additionally, hints may guide the selection of CDNs, caches, or other server locations so as to improve page load time. Embodiments described herein provide such hints to the client computers in a manner that is computationally generated (e.g., generated by machine based on feedback and analysis, as opposed to being generated manually by coders based on assumptions) and content server-driven (e.g., provided to client computers without relying on persistent connections between client computers and hinting servers).

Such hinting functionality can be implemented in a number of different ways. To that end, the communications system environment 100 of FIG. 1 is intended to support a number of different implementations of various embodiments, so that some implementations may have more or fewer components, in communication in the same or different ways, exchanging the same or different types of data as those illustrated in FIG. 1. For example, in one set of embodiments, each content server 120 can inform client computers 110 of relevant hinting information relating to requested web pages by consulting with a hinting processor 130 that is either part of, or in communication with, the content server 120. In another set of embodiments, each content server 120 can direct client computers 110 to establish communications with an appropriate hinting processor 130 to directly retrieve relevant hinting information relating to requested web pages. These and other embodiments are described more fully herein.

Client computer(s) 110 can be implemented as any suitable computing device having memory resources, processing resources, and network communication resources. For example, the client computers 110 can be desktop computers, tablet computers, laptop computers, mobile phones, personal data assistants, network enabled wearable devices, network enabled home appliances, etc. Each client computer 110 includes one or more page renderers 115. Page renderer 115 can include any system implemented in a client computer 110 that enables a web page transaction, and that is used, at least in part, for rendering a web page and presenting it to a user via an output device of the client computer 110.

Content server(s) 120 can generally include any one or more computational environments for serving (e.g., hosting and/or otherwise providing access to) web page content to the client computers 110 via the communications network 140. For example, the content servers 120 can include web servers, content distribution networks (CDNs), caches, or the like. As illustrated, the content servers 120 can include, or be in communication with, one or more data storage systems having web pages 125 stored thereon. As described herein, it is assumed that the web pages 125 are made up of multiple page objects 127. For example, loading one of the web pages 125 can involve requesting, receiving, and rendering the page objects 127 that make up the web page 125. Some or all of the page objects 127 of the web pages 125 served by the content servers 120 can be stored in the data storage systems, or some or all of the page objects 127 can be stored remote from the content servers 120.

In some implementations, the content servers 120 are configured to receive page requests 141 for web pages 125, and to communicate page responses 143 including one or more page objects 127 based on the root request. In some implementations, the page responses 143 can include hinting scripts 145. The hinting scripts 145 can be sent in any suitable manner in conjunction with the page responses 143, for example, as a separate or stand-alone response (e.g., before or after a root response to a web page request), as part of one or more page objects 127 in a response, in the same response as one or more page objects 127, etc. For example, the hinting scripts 145 can be injected into the page responses 143 as part of web page 125 code (e.g., as part of the HTML source code for a web page, etc.), as part of a data protocol or format (e.g., in HTML headers, etc.), or in any other suitable manner.

As described herein, the hinting scripts 145 can include different types of information in different types of implementations. In one illustrative type of implementation, the hinting script 145 is generated by the content server 120 to include hints 150*a* relating to rendering the requested web page 125. In another illustrative type of implementation, the hinting script 145 is generated by the content server 120 to include a link, address, or other instruction directing the requesting client computer 110 to contact an appropriate hinting processor 130 to receive hints 150*b* relating to rendering the requested web page 125. Further, in some implementations, the hinting script 145 includes instructions for monitoring, generating, and/or communicating hinting feedback 147 relating to the actual rendering of the requested web page 125. In such implementations, the hinting feedback 147 can be communicated from the client computers 110 directly to the hinting processors 130, to the hinting processors 130 via the content servers 120, or in any other suitable manner. The information included in the hinting scripts 145 and/or the execution thereof can depend on characteristics of the client computers 110 and/or other components of the communications system environment 100. For example, if a client computer 110 is known not to support hints 150, but does support feedback; only the feedback script may be injected. In other embodiments, if the client computer 110 does not support feedback information (e.g., due to privacy settings or other such issues), client computer 110 may still use hints 150 derived from feedback information provided by other client computers 110.

The one or more hinting processors 130 can be implemented as one or more stand-alone server computers, as part of one or more content servers 120, and/or in any other suitable manner for maintaining and updating hinting information 135 according to hinting feedback 147 from client computers 110, and computing hints 150 from the hinting information 135. The hinting information 135 can be stored in one or more data stores that are part of, coupled with, or in communication with the hinting processors 130, or in any other suitable manner. Embodiments support many different types of hinting information 135 and hints 150 generated therefrom, including, for example, information relating to which page objects 127 are needed to render the web pages 125, timing information relating to those page objects 127

(e.g., the order and timing by which the page objects 127 should be requested), etc. The hinting information 135 can be maintained, computed, updated, etc. in any suitable manner, including according to the hinting feedback 147 received from one or more client computers 110. Embodiments of the hinting processor 130 apply machine learning techniques to hinting feedback 147 from multiple related web page transactions (e.g., from multiple instances of multiple client computers 110 rendering the same (or sufficiently similar) web pages). Received hinting feedback 147 can be used to refine, hone, update, reinforce, or otherwise improve machine-driven hinting models maintained by the hinting processor 130, thereby facilitating generation and communication of optimized hints.

In some implementations, the hinting information 135 is stored without reference to the originating client computers 110 or page renderers 115 that provided associated hinting feedback 147 (e.g., the received hinting feedback 147 is anonymized, aggregated, etc.). In other implementations, the hinting information 135 is stored with reference to the originating client computers 110 or page renderers 115 that provided associated hinting feedback 147 (e.g., to enable certain hints to tailored to client computers 110 and/or page renderers 115). In other implementations, hinting information 135 can be aggregated, semi-anonymized, and/or otherwise processed. For example, this can reduce privacy implications of collecting feedback information, while enabling geographic-based hints or hints associated with particular content delivery networks (CDNs) (e.g., according to groups of internet protocol (IP) addresses associated with groups of client computers 110 that have certain geographies, associations with CDNs, etc.).

The client computers 110 can render requested web pages 125 according to hints 150 generated from the hinting information 135 that effectively predict which page objects 127 the client computers 110 will need at which times to optimally render the web pages 125; the client computers 110 can actually render the web pages 125 according at least to the received hints 150; the actual rendering of the web pages 125 can be monitored by the client computers 110 to determine which page objects 127 were actually used to render the pages according to which timings; and the monitored information can be fed back (i.e., as the hinting feedback 147) to the hinting processors 130 for use in updating the hinting information 135 and refining future hint 150 generation. In some implementations, the client page renderers 115 receive feedback instructions (e.g., as part of the hinting scripts 145), and they provide the hinting feedback 147 according to the hinting scripts 145. In other implementations, the client page renderers 115 are configured to automatically generate and/or provide the hinting feedback 147 without instruction from the hinting scripts 145 (e.g., and/or in conjunction with the hinting scripts 145, in contravention of the hinting scripts 145, or otherwise as desired).

As described below, hints 150 can be provided in various ways according to different implementations. The page renderers 115 can request web pages 125 from the content servers 120 using page requests 141, and the client computers 110 can receive page objects 127 for the requested web pages 125 from the content servers 120 in page responses 143. The page responses 143 can include the page objects 127 and hinting scripts 145. In some implementations, in response to the page requests 141, the content servers 120 can request hints 150 from (i.e., send hinting requests to) the hinting processors 130 (which may be part of the content servers 120 or separate from the content servers 120), In response to the hinting requests, the hinting processors 130 can return hints 150 (shown as hints 150a) to the content servers 120, which can be communicated back to the requesting client computers 110 (e.g., as part of the hinting scripts 145, injected into page code, embedded in one or more page objects 127, etc.). In other implementations, in response to the page requests 141, the content servers 120 can send hinting scripts 145 to the requesting client computers 110, and the hinting scripts 145 can include instructions for receiving appropriate hints 150 from appropriate hinting processors 130 (e.g., executable code with network addresses of the hinting processors 130, credentials, etc.). When the client computers 110 execute the hinting scripts 145, they may establish communication with one or more hinting processors 130, communicate hinting requests to those hinting processors 130, and receive hints 150 (shown as hints 150b) from the hinting processors 130.

FIGS. 2A and 2B show a flow diagram of an illustrative method 200 for improving web page loading, according to some embodiments. FIGS. 2A and 2B, though spread over two pages, are intended to represent a single method 200, where connector "A" links the portions of the method 200. The method 200 is described in context of system components described with reference to FIG. 1, including a page renderer 115, a content server 120, and a hinting processor 130. Attribution of method stages to particular system components is intended for added clarity, and should not be construed as limiting the method stages to the particular system architectures shown in FIG. 1.

Embodiments of the method 200 begin on FIG. 2A at stage 204 by communicating, from the client page renderer 115 to the content server 120 over a communications network (e.g., network 140 of FIG. 0.1), a page request for a web page having a number of page objects. The page request can be a root request or any other suitable request, and can be issued in response to a user click in a web page interface, a voice command, a mouse hover, a touchpad or touchscreen interaction, a keyboard entry, a search query, or any other such user election that initiates a web page transaction. At stage 208, the content server 120 can generate a hinting request in response to receiving the page request, and the content server 120 can communicate the hinting request to the hinting processor 130. In some implementations, communicating the hinting request can involve determining whether hinting information is available for this page transaction. For example, the content server 120 can communicate with the hinting processor 130 to determine whether any hints (or underlying hinting information) is available from previous analyses of transactions involving the requested web page. Some such implementations may only use hinting information developed under comparable circumstances. For example, the hinting information may be considered available only when developed for a similar type of page renderer 115 (e.g., a similar browser type, etc.), when developed for a similar client computational platform (e.g., a similar type of device, a device with similar capabilities, etc.), when it is determined that the client computer and/or the page renderer 115 can work with hints (e.g., or with hints of the type available), when developed within a certain timeframe preceding the request (e.g., so that the hints are fresh), when the hinting processor 130 can determine that no significant alterations have been made to the page, etc. At stage 212, the hinting processor 130 can receive the hinting request from the content server 120. The hinting request can include information about the requested page, the requesting page renderer 115 (or client computer), etc. In some embodiments, the page response can include one or more page objects of the requested web page, one or more hinting scripts, and/or other information. For example, the page response can be a root response having the hinting script injected or otherwise included in the response.

At stage 216, the hinting processor 130 can generate a hinting response in response to the hinting request, such that the hinting response includes hints directed to optimized fetching of an anticipated set of the page objects anticipated to be used to render the requested web page according to hinting information maintained by the hinting processor 130. The hinting response (i.e., and thereby the hints) can be communicated, at stage 220, from the hinting processor 130 to the content server 120 in response to the hinting request. At stage 224, the content server 120 can direct the client page renderer 115 to render the web page at least according to the hinting response (i.e., according to the hints and, in some instances, other information).

In certain embodiments, the hinting response is communicated to the page renderer 115 as a hinting script, a feedback script, or in any other suitable manner. For example, the hinting response (e.g., the hinting script) can be implemented using the World Wide Web Consortia (W3C) resource timing and navigation application programming interfaces (APIs), which can define actions to record object timings and to confirm that the timings can be shared with the content server 120. The API can additionally use Internet Engineering Task Force (IETF) resource and navigation timing definitions, and/or any other suitable definitions, to define aspects of the script. The use of these or other elements in the hinting response can enable compatibility with standard page renderers without the need for customization to enable feedback information from a feedback script to be communicated from client computer 110 to content server 120. In other embodiments, customized page renderer modules or plug-ins can be installed on the page renderer 115 that can enable hinting and/or feedback scripts to be executed on a particular client computer. In yet other embodiments, the page renderer 115 can incorporate built-in hinting processing and/or feedback functionality and/or implement such functionality using a plug-in, extension, etc.

The method 200 continues on FIG. 2B with the page renderer 115 rendering the web page at least according to the hinting response at stage 228. For example, rendering the page can include requesting additional page objects for the requested web page in accordance with the hints, receiving those requested page objects from the content server 120, and rendering the web page using the page objects (e.g., displaying visual objects, such as text, images, etc.; playing and/or embedding audiovisual content, such as videos, music, etc.; executing scripts; etc.). In some implementations, the rendering effectively causes the requested page to be displayed in a graphical user interface of the page renderer 115. For the sake of illustration, the method 200 shows page objects being requested and returned in stages 228 and 232, respectively.

Having rendered the web page(s), the page renderer 115 can, as stage 236, generate hinting feedback and communicate the hinting feedback in accordance with the rendering. For example, while the page renderer 115 renders the web page(s), it can monitor which page objects are actually rendered, order and/or other timing information relating to the loading and rendering, and/or any other information than can be useful to the hinting processor 130 in generating future hints. In one implementation, while child requests and responses are occurring, a feedback script or other mechanism can identify timings associated with individual child objects, identify uniform resource locators (URLs) for individual rendered objects, monitor overall timings for the entire web page transaction, monitor caching information for child objects cached at client computer 110, monitor details associated with one or more domain name servers (DNS) that may be used during a lookup process for an object, and/or monitor (e.g., track, derive, compute, etc.) any other such information that may be observed during the rendering.

At stage 240, the hinting feedback can be received at the hinting processor 130 from the client page renderer 115 subsequent to the client page renderer 115 rendering the web page at least according to the hinting response. In some implementations, the hinting feedback is communicated directly from the page renderer 115 to the hinting processor 130. In other implementations, the hinting feedback is communicated from the page renderer 115 to the content server 120 (e.g., the content server 120 that is effectively controlling the page transaction). In such implementations, the content server 120 can forward (e.g., with or without modification) the hinting feedback to the hinting processor 130, as indicated by stage 238. The hinting feedback can be communicated in any suitable manner. For example, the hinting feedback can be communicated all at one time, over multiple transactions, immediately after the web page is rendered, while the page is being rendered, after some delay, etc.

At stage 244, the hinting processor 130 can update the hinting information according to the hinting feedback. Certain embodiments wait until hinting feedback is seen by the hinting processor 130 for a threshold number of instances of an object or a web page transaction before associated hinting information is updated and/or before associated hints are generated. In some implementations, hints generated as a result of visiting one web page can be used to generate hints for a different but similar web page for which direct feedback is not available. For example, the feedback resulting from a visit to "www.latestnews.com" may be used to generate hints for a visit to "www.latestnews." Similarly, some implementations permit hint information for an object that is used in multiple different web pages to be used in web page transactions for different web pages. For example, if a picture is commonly used by many web pages, hinting feedback about the picture object may be used to generate hints about that picture object, and the hints for that picture object may be communicated as part of a page response for any web page transaction that includes the picture object.

Some embodiments support server-machine-driven hinting and client-machine-driven feedback for multiple domains within a web page. For example, some web pages operate generally within a single domain (or hints and/or hinting feedback are generated only with respect to the dingle domain). In such instances, the client computer 110 can send a page request to the content server 120 requesting a web page. This can result in hint requests and hint responses being communicated for all page objects used to render that web page from the content server 120 domain, and hinting feedback being communicated from the page renderer 115 to the content server 120 (e.g., and/or the hinting processor 130) for all page objects rendered on that web page associated with the content server 120 domain. In other instances, web pages can include page objects invoking (e.g., hosted via) multiple domains, sub-domains, etc. For example, the client computer 110 can send a page request to the content server 120 requesting a web page. This can result in hint requests and hint responses being communicated to multiple content servers 120 for page objects used to render that web page from the respective domains (and sub-domains) of those content servers 120, and hinting feedback being communicated from the page renderer 115 to the multiple content servers 120 (e.g., and/or multiple hinting processors 130) for all objects rendered on that web page associated with the respective content server 120 domains.

Figure 3A:
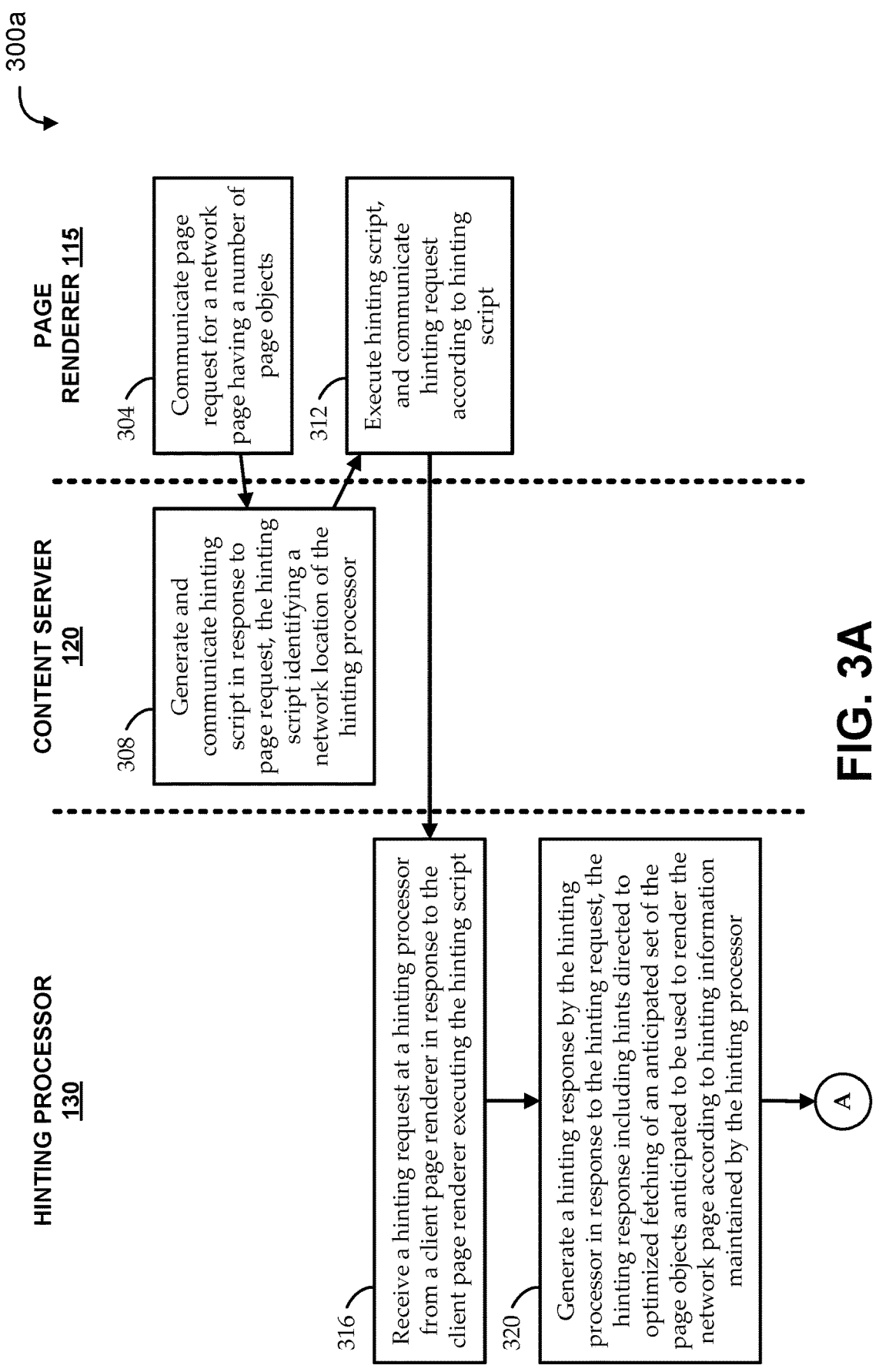
FIGS. 3A and 3B show a flow diagram of another illustrative method for improving web page loading, according to other embodiments.
Figure 3B:
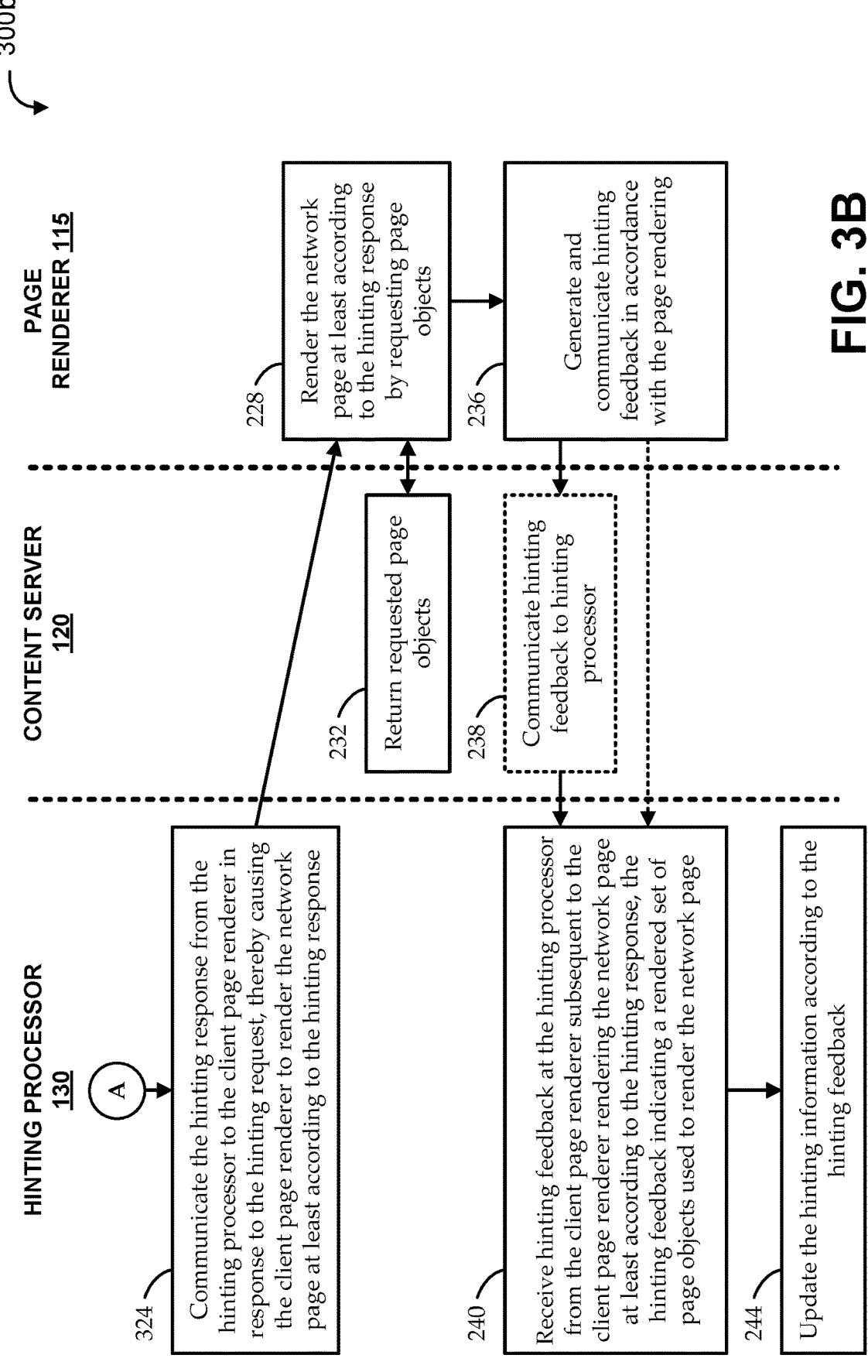

FIGS. 3A and 3B show a flow diagram of another illustrative method 300 for improving web page loading, according to alternative embodiments to those described with reference to FIGS. 2A and 2B. FIGS. 3A and 3B, though spread over two pages, are intended to represent a single method 300, where connector "A" links the portions of the method 300. The method 300 is described in context of system components described with reference to FIG. 1, including a page renderer 115, a content server 120, and a hinting processor 130. Attribution of method stages to particular system components is intended for added clarity, and should not be construed as limiting the method stages to the particular system architectures shown in FIG. 1.

Embodiments of the method 300 begin on FIG. 3A at stage 304 by communicating, from the client page renderer 115 to the content server 120 over a communications network (e.g., network 140 of FIG. 0.1), a page request for a web page having a number of page objects. Stage 304 can be similar to stage 204 described above with reference to FIG. 2A. At stage 308, the content server 120 can generate and communicate a hinting script in response to the page request, such that the hinting script identifies a network location of the hinting processor 130. For example, executing the hinting script enables the page renderer 115 to establish communications with an appropriate hinting processor 130 for retrieving hints relating to the requested web page. At stage 312, in accordance with executing the script, the page renderer 115 can communicate a hinting request to the hinting processor 130. References to "executing the script" herein are intended broadly to include any similar type of functionality. For example, the hinting script may not be formulated as a script or other executable set of instructions; instead being formulated as an address or other information that the page renderer 115 knows how to use to produce the desired functionality. In some implementations, generating and/or communicating the hinting script by the content server 120 at stage 308, generating or communicating the hinting request by the page renderer 115 at stage 312, generating a hinting response by the hinting processor 130 (as in stage 320 below), and/or other stages of the method 300 can be impacted by determinations similar to those described above with reference to stage 208 of FIG. 2A. For example, the determinations can include determining whether hinting information is available for this page transaction, whether any hints (or underlying hinting information) are available from previous analyses of transactions involving the requested web page, whether related hinting information was developed under comparable circumstances, etc. At stage 316, the hinting processor 130 can receive the hinting request from the page renderer 115. The hinting request can be similar to, or different from, the hinting request received from the content server 120 described above with reference to stage 212 of FIG. 2A.

At stage 320, the hinting processor 130 can generate a hinting response in response to the hinting request, such that the hinting response includes hints directed to optimized fetching of an anticipated set of the page objects anticipated to be used to render the requested web page according to hinting information maintained by the hinting processor 130. The hinting response can be similar to, or different from, the hinting response generated above with reference to stage 216 of FIG. 2A. At stage 324 (turning to FIG. 3B), the hinting response (i.e., and thereby the hints) can be communicated from the hinting processor 130 to the requesting page renderer 115 in response to the hinting request.

The remaining stages of the method 300 are similar to those described above with reference to FIG. 2B, and are identified by the same reference numerals, accordingly. For example, the page renderer 115 can render the web page at least according to the hinting response at stage 228. For example, rendering the page can include requesting additional page objects for the requested web page in accordance with the hints, and the content server 120 returning those requested page objects to the page renderer 115, as illustrated by stages 228 and 232, respectively. Having rendered the web page(s), the page renderer 115 can, as stage 236, generate hinting feedback and communicate the hinting feedback in accordance with the rendering. At stage 240, the hinting feedback can be received at the hinting processor 130 from the client page renderer 115 subsequent to the client page renderer 115 rendering the web page at least according to the hinting response. At stage 244, the hinting processor 130 can update the hinting information according to the hinting feedback.

FIG. 4 shows an illustrative page renderer that may be used with various embodiments. The page renderer 400 can be an implementation of page renderer 115 of FIG. 1. As illustrated, the 4page renderer 400 can include a control module 410, renderer 420, rendered web page output 422, parser 430, look ahead module(s) 432a and 432b, object fetcher 440, render request 442, hint prefetch module(s) 450a and 450b, script executer 460, cache 470, hints 480, and hint memory 490. In some implementations, the page renderer 400 is a client web browser.

As part of page renderer 400, control module 410 manages the requests and responses for root and child objects, as well as the communication between different elements of the page renderer 400. Object fetcher 440 may manage the communication requests as they are made to and from a content server, including handling caching of objects in cache 470. Parser 430 parses through web objects and may include look ahead 432 that functions to perform a first level of prefetching for objects in a web page transaction. Hint memory 490 and hint prefetch 450 may create and use data from previous web transactions to perform an additional level of transaction optimization through prefetching and/or cache management. Renderer 420 renders the web page for output to rendered web page output 422, which may be a computer display, a phone display, or any other suitable output for a page renderer 400 operating on a computing device.

Script executor 460 executes code that may be part of an object. This may include a script (e.g., hinting scripts 145 of FIG. 1, feedback scripts, etc.) received as part of a root response in an HTTP header or as HTML in the body of an object, child script objects that are part of a web page transaction, and/or any other suitable scripts.

In one example, page renderer 400 is implemented as a web browser that can function to download and present a web page associated with the URL "www.latestnews.com" and four child object URLs: "LN-main.gif"; "LN.styles.css"; "LN.js"; and "1.gif&rand=96759."

In an initial step as part of a transaction for such a web page, a root request may be communicated to a web server computer when a user that is using a client computer operating page renderer 400 makes a selection with a mouse click, a keyboard entry, touchscreen interaction, a search query, or any other appropriate action. When a root response to the root request for "www.latestnews.com" is received by the client computer from the web server computer, the root response may include a feedback script in the HTTP header of the root response or in the HTML code of an object that is part of the root response. When this script is identified, it will be sent to script executer 460. Script executer 460 may execute the feedback script to gather feedback information for each of the child objects. A standard web browser process may then proceed as part of the web page transaction.

For such an example root response, parser 430 may then parse through the response and identify the first two child object URLs. Depending on the rendering status, these first two child object URLs may be requested by renderer 420 such that a message from render request 442 communicates with the web server computer or another appropriate content server to request these objects. Alternately, if renderer 420 is delayed in requesting the initial child objects, look ahead 432a may identify the child object URLs from parser 430 and prefetch the objects via a request from look ahead 432b to the content server. The objects may then be prefetched either to cache 470 or to the renderer 420 in various alternative embodiments. If the root response additionally includes hints, these hints may also be processed to identify additional child URLs. For example, if "LN.styles.css" includes references to ten additional child objects, the hints may be used to pass URLs for these ten objects to look ahead 432a prior to "LN.styles.css" even being requested by page renderer 400 (i.e., web browser). The hints may include additional information that allow object fetcher 440 to determine whether to prefetch the ten additional child objects immediately, in stages, or not to prefetch them at all. The more likely these ten objects are to delay the overall web page render time, as indicated by the hints, the more aggressively the objects will be prefetched.

Child object 3 ("LN.js"), however, is a script, and is therefore sent to script executer 460 rather than to parser 430. Script executer 460 executes the child object and communicates any output to renderer 420. In the example of "www.latestnews.com" presented here, the result of "LN.js" may pass instructions for requesting child object 4 using "1.gif&rand=96759", where "1.gif&rand=96759" is the URL for child object 4 that is output from script executer 460. Renderer 420 will then request child object 4 from a content server via render request module 442. In certain embodiments, hints sent with the root response may identify that "LN.js" must be executed before the fourth URL can be identified, and this may enable page renderer 400 to prioritize the execution of "LN.js" in order to lower the overall page rendering time.

As described by FIG. 4, then, hints 480 may be identified by parser 430 or other aspects of a controller, and sent to hint memory 490. Script executer 460, object fetcher 440, or any other module of page renderer 400 may then perform actions based on hints 480 as stored in hint memory 490 and analyzed by control module 410. This may allow hints not only to initiate prefetching with hint prefetch 450b, but also to enable verification of objects in cache 470 via hint prefetch 450a. Further, renderer 420 may communicate specific details of the rendering process, including lists of child URLs, rendering times and timings for individual child objects, and complete rendering times in a way that enables feedback information to be captured by the feedback script being executed by script executer 460.

Although FIG. 4 shows one potential embodiment of a page renderer in accordance with aspects of the current innovations, alternative page renderers are consistent with these innovations. For example, while page renderer 400 includes cache 470, in alternative embodiments this may include both browser cache 470 and other cache memory that may be external to the page renderer, or operating on a completely different computing device from the page renderer. Similarly, the page renderer may use multiple history databases based on locally captured information in addition to hints that are from a root response. Further, any of the elements may be integrated as part of the core function of the page renderer or coupled with any other element. Alternatively, in certain embodiments elements of the page renderer shown in FIG. 4 may function as a plug-in module that works in conjunction with a page renderer. For example, the page renderer can be a web browser, a browser plugin, or any other suitable client application (e.g., including thin clients, apps, etc.).

Figure 5:
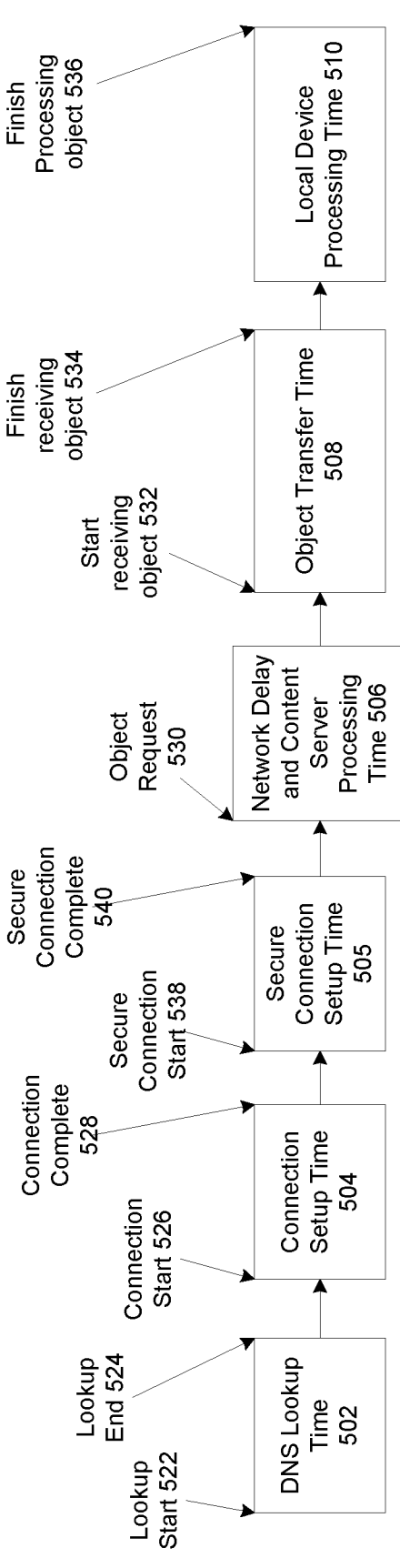
FIG. 5 illustrates aspects of an object associated with a web page transaction that may be used to create feedback information and hints according to certain embodiments described herein.

FIG. 5 shows a timing flow 500 representing an example of a timing for a single object of a web page. Single object timing 500 includes DNS lookup time 502, connection setup time 504, network delay and content server processing time 506, object transfer time 508, and local device processing 510. DNS lookup time 502 begins at lookup start 522 and ends at lookup end 524. Connection setup time 504 begins at connection start 526 and ends at connection complete 528. In some instances, it is desirable to establish a secure connection, for example, in context of hypertext transport protocol secure (HTTPS). In such instances, subsequent to completing the connection setup time at connection complete 528 (e.g., after setting up a TCP connection), there can be a secure connection setup time 505 that begins at secure connection start 538 and ends at secure connection complete 540. Network delay and content server processing time 506 begins with object request 530 and ends with start receiving object 532. Object transfer time 508 begins with start receiving object 532 and ends with finish receiving object 534. The overall single object timing 500 ends with finish processing object 536. In certain embodiments, elements 522 through 536 may be associated with clock times of a device, with the time elements 502 through 510 determined by the differences between the clock times associated with elements 522 through 536.

While this particular set of object timings may occur as a series of steps in a process beginning with block 502 and proceeding in time through the end of block 510, any step and object timings for object transfer may be understood to function with the innovations described herein. In a typical object transaction, a DNS lookup time 502, which describes the time required to translate a URL into an IP address using DNS systems may be in the order of thirty milliseconds for a terrestrial broadband system, a connection setup time 504 for a TCP connection may be on the same order of magnitude unless the server is slow to make the connection. For other types of connections, different connection setup times may apply. A network delay and content server processing time 506 and an object transfer time 508, however, may vary greatly depending on the server, the type of request, the size of the object, and the connection bandwidth. The network delay and content server processing time 506 refers to the amount of time from when a page renderer sends an object request 530 and when the page renderer starts receiving the object at start receiving object 532. If the web server computer is slow to process the request, this may result in block 506 being a relatively large amount of time.

In certain embodiments, hints may identify a content server with a long network delay and content server processing time 506, and provide a page renderer with a CDN that may enable the page renderer to retrieve the object from a different place. Similarly, if a content server is bandwidth constrained, object transfer time 508 may vary greatly, and the use of an alternate content source for an object may reduce the overall object timing by a significant amount that lowers an overall render time for a web page transaction. Many types of hints are possible for improving web page load performance, including, for example, URLs for web objects, web object freshness meta-data, web object size, web object type, web object fingerprint or checksum (e.g., used to validate the content that is about to be fetched), probability that a web object will be used (e.g., expressed as a function of time), web object priority (e.g., its relative importance in the page rendering process), web object relative timing (e.g., when it will be needed during the page rendering process), web object dependencies (e.g., including dependencies on other objects and cookies), scripts that the requesting agent may execute to dynamically create hinted URLs, domain name hints that enable the requesting agent to pre-resolve domains, redirect chain hints (e.g., including cookie meta-data that can inform the requesting agent whether it needs to wait for cookies to be set before fetching select objects), TCP connection usage hints that inform the requesting agent as to how to best allocate TCP connections to requests, secure connection pre-connect hints that inform the requesting agent to pre-establish secure connections and that may provide metadata that reduces the number of round trips for establishing those connections, signature information to secure and validate the hint, hint freshness and expiry, metadata about the hint response that may be used in post-processing analysis, etc.

For a simple content server processing time as part of block 506 on a fast server, the timing may be measured in milliseconds, but for a slow server or a complex database query made to a slow or very large database, the server processing time may be seconds, minutes, or longer. Similarly, for a large file being downloaded over a connection where the bandwidth is not large compared to the file size, object the transfer time 508 may be much longer than single or double digit millisecond timings.

Additionally, the "render time" for a web page which is shown as local device processing time 510 may be used as web page load timing information for web page objects. Render time is the time that the object is actually used by a page renderer. For instances where a system needs to prioritize objects, render time may function along with dependency information, download time, content server response time, and any other information that impacts a final page load to prioritize object fetching, and thus hints provided by systems described herein may be influenced by the render time at a local device.

This overall single object timing 500, then, is determined by the chain of timing factors from lookup start 522 until finish processing object 536. In other embodiments, additional timings may be included within these timings or prior to lookup start 522. For an entire web page, multiple objects that must be downloaded serially, thus repeating the object timings listed above, may further add to a timing for rendering of an entire web page. An entire web page transaction may be made up of multiple a single object transactions or a very large number of object transactions, where each object transaction may include timings similar to those shown in single object timing 500 of FIG. 5.

Figure 6:
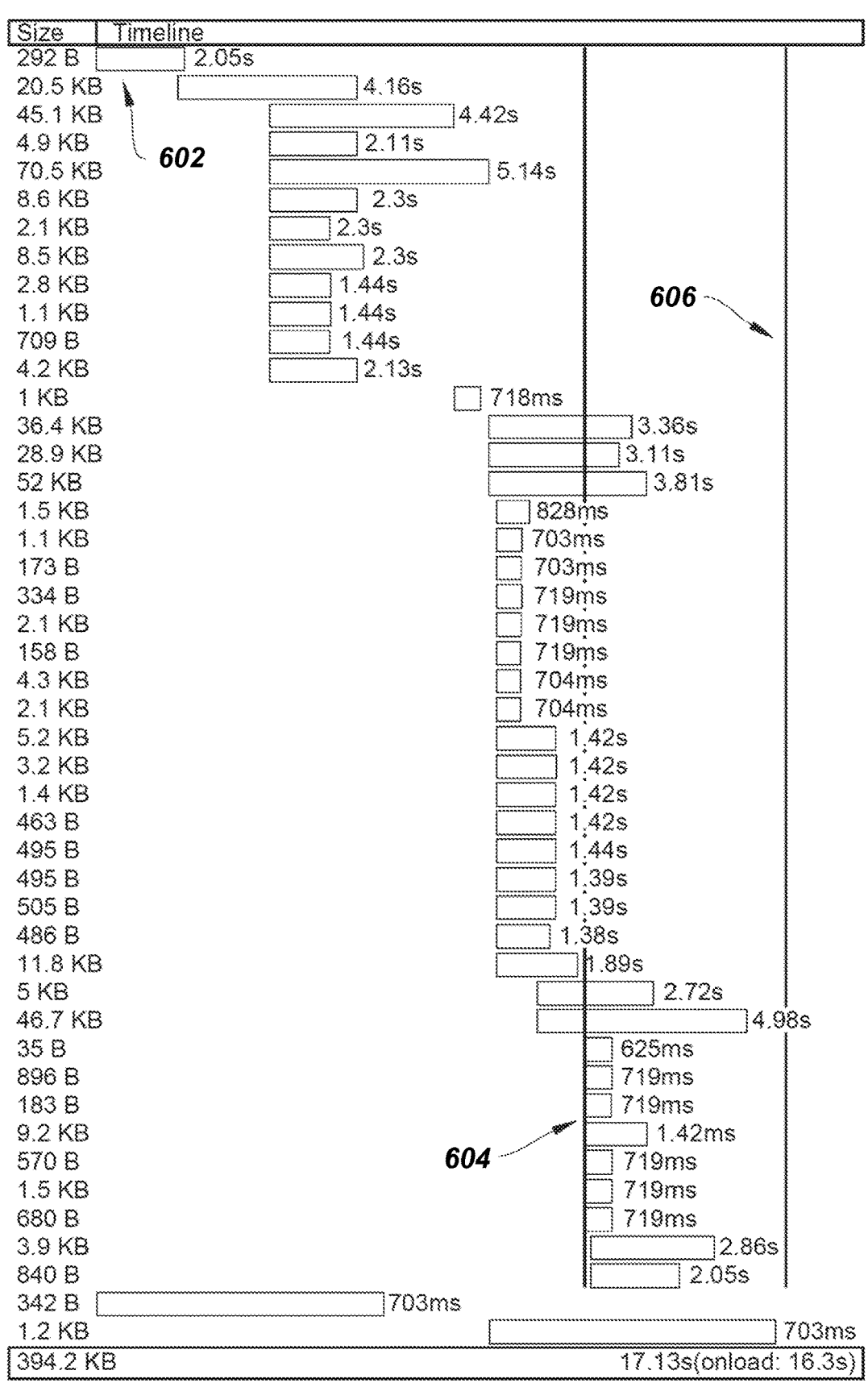
FIG. 6 illustrates aspects of a web page transaction that may be used to create feedback information and hints according to certain embodiments described herein.

FIG. 6 shows a timing chart for one potential embodiment of a web page transaction that may be analyzed and accelerated in accordance with embodiments of the present innovations. The chart shows a list of objects with a total timing and size at the bottom, and a position during the entire transaction when each object has an associated request and response. The root request of FIG. 6 is labeled as 602, with a root response size of 292 bytes and a 2.05 second request/response time that begins at the very beginning of the web page transaction. The web page transaction includes a number of child requests and responses that are shown as beginning after the completion of the root response. The child requests and responses occur in several stages, with the final set of requests occurring at the time shown by the line indicated by 604, and the final response ends roughly at the timing line indicated by timing 606. At the time indicated by timing 606, the web transaction is complete and ready for complete display to a user.

If the web page transaction of FIG. 6, where each object has a single object timing (e.g., similar to single object timing 500 of FIG. 5), is performed using a page renderer (e.g., such as web page renderer 400 of FIG. 4 with a feedback script being executed by script executer 460), significant amounts of feedback information may be generated. Such an embodiment may be implemented using the standardized W3C resource timing API, which can provide detailed network timing data for each object. Such an API is available to any web page. In some web browsers, this API can be implemented as part of a global "window.performance" object, with a "performance.getEntries" that returns an array of resource timing objects.

Referring back, for example, to related portions of FIG. 5, each of lookup start 522, lookup end 524, connection start 526, connection complete 528, object request 530, receiving object 532, finish receiving object 534, and finish processing object 536 may be associated with a particular resource timing object as part of the W3C resource timing API. The feedback script may call these resource timing objects in association with each object to receiving time values for each element. These time values may then be sent to a web server computer as feedback information. These time values may then be processed to calculate the associated times 502 through 510, and these times may be used to determine hints including aggressiveness levels for prefetching individual objects as part of a web page transaction.

In various other embodiments, other standardized APIs or customized APIs may be used not only for these timing objects, but also for caching information, URL information, and any other such information that relates to the web page transaction.

Figure 7:
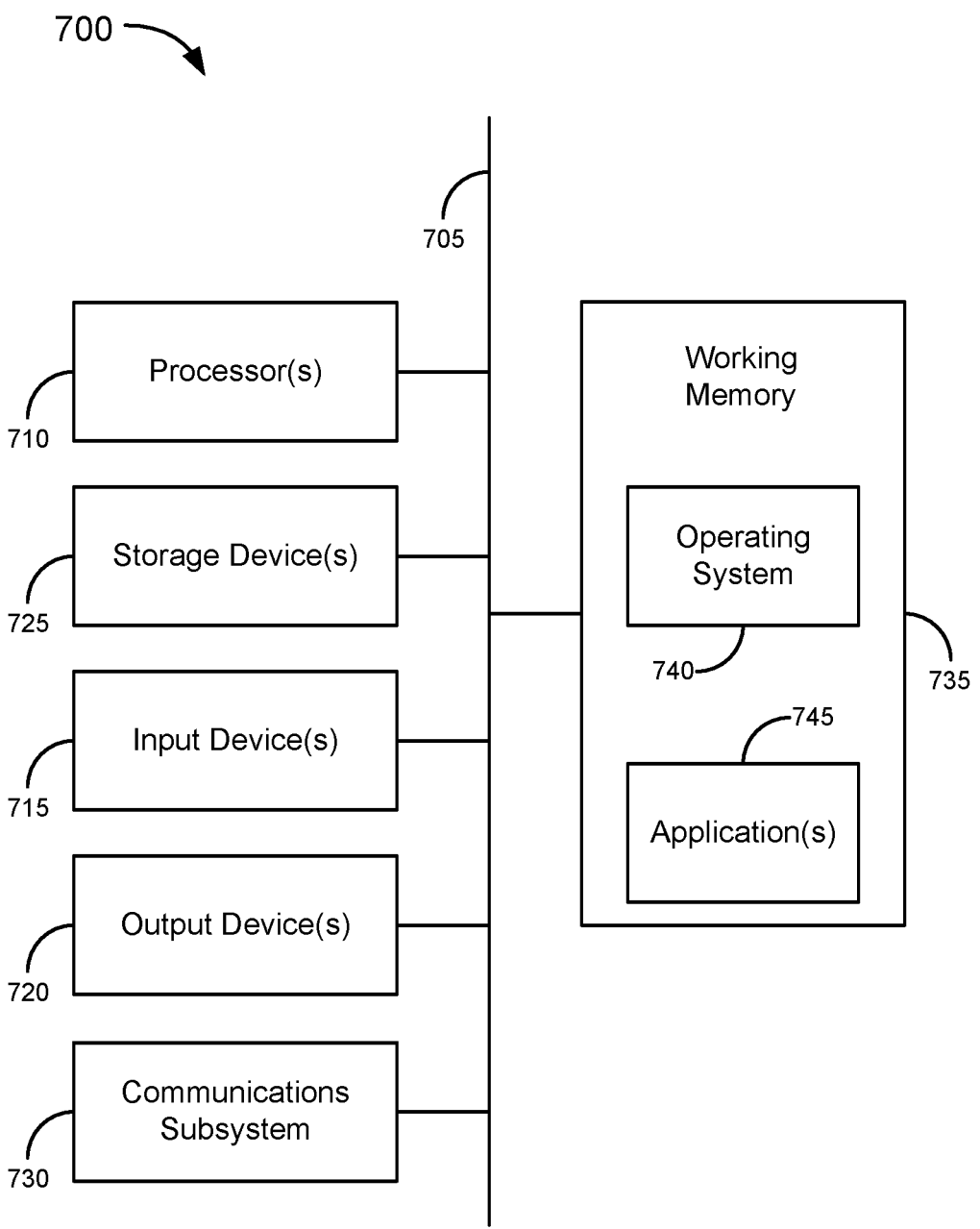
FIG. 7 illustrates a block diagram of one implementation of a computing device that may be used in accordance various embodiments presented herein.

FIG. 7 provides a schematic illustration of one embodiment of a computer system 700 that can perform the methods of the invention, as described herein, and/or can function, for example, as any part of client computer(s) 110, content server(s) 120, hinting processor(s) 130, or any other such computer or device. It should be noted that FIG. 7 is meant only to provide a generalized illustration of various components, any or all of which may be utilized, as appropriate. FIG. 7 therefore broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements can include one or more processors 710, including, without limitation, one or more general-purpose processors and/or one or more special-purpose processors (such as digital signal processing chips, graphics acceleration chips, and/or the like); one or more input devices 715, which can include, without limitation, a mouse, a keyboard, touchscreen, and/or the like; and one or more output devices 720, which can include, without limitation, a display device, a printer, and/or the like.

The computer system 700 may further include (and/or be in communication with) one or more storage devices 725, which can comprise, without limitation, local and/or network accessible storage and/or can include, without limitation, a disk drive, a drive array, an optical storage device, a solid-state storage device such as a random access memory ("RAM") and/or a read-only memory ("ROM"), which can be programmable, flash-updateable, and/or the like. The computer system 700 might also include a communications subsystem 730, which can include, without limitation, a modem, a network card (wireless or wired), an infrared communication device, a wireless communication device, and/or chipset (such as an 802.11 device, a WiFi device, a WiMax device, cellular communication facilities, etc.), and/or the like. The communications subsystem 730 may permit data to be exchanged with a network (such as the network described below, to name one example), and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740 and/or other code, such as one or more applications 745, which may comprise computer programs of the invention and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program a general-purpose computer with the instructions/code stored thereon. These instructions might take the form of executable code, which is executable by the computer system 700, and/or might take the form of source and/or installable code which, upon compilation and/or installation on the computer system 700 (e.g., using any of a variety of generally available compilers, installation programs, compression/decompression utilities, etc.), then takes the form of executable code. In certain embodiments, this may include page renderer functionality and may include separate page renderer modules as part of this page renderer functionality executed by a process to enable display of a web page on an output device 720 of such a computer system 700.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 700) to perform methods of the invention. According to a set of embodiments, some or all of the procedures of such methods are performed by the computer system 700 in response to processor 710 executing one or more sequences of one or more instructions (which might be incorporated into the operating system 740 and/or other code, such as an application 745) contained in the working memory 735. Such instructions may be read into the working memory 735 from another machine-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer-readable medium", as used herein, refer to any medium that participates in providing data that causes a machine to operate in a specific fashion. In an embodiment implemented using the computer system 700, various machine-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms including, but not limited to, non-volatile media. Non-volatile media includes, for example, optical or magnetic disks, such as the storage device(s) 725. Common forms of physical and/or tangible computer-readable media include, for example, a flexible disk, hard disk, magnetic tape or any other magnetic medium, a CD-ROM or any other optical medium, solid-state circuit based memory or any other memory chip or cartridge, or any other medium from which a computer can read instructions and/or code. Various forms of machine-readable media may be involved in carrying one or more sequences of one or more instructions to the processor(s) 710 for execution. Merely by way of example, the instructions may initially be carried on a memory of a remote computer. A remote computer might load the instructions into its dynamic memory and send the instructions as signals over a transmission medium to be received and/or executed by the computer system 700.

The communications subsystem 730 (and/or components thereof) generally will receive the signals, and the bus 705 might then carry the signals (and/or the data, instructions, etc., carried by the signals) to the working memory 735, from which the processor(s) 710 retrieves and executes the instructions. The instructions received by the working memory 735 may optionally be stored on a storage device 725 either before or after execution by the processor(s) 710.

A set of embodiments includes systems for implementing improved web page rendering and improved network resource usage based, for example, on the creation and use of sets of hints from embedded feedback scripts and/or the like. FIG. 8 illustrates a schematic diagram of a network system 800 that can be used in accordance with one set of embodiments. In such embodiments, the network system 800 may represent any number of client and server devices that enable content to be communicated from content providers to user systems as part of web page transactions across a network. The system 800 can include one or more user computers 805, such as computers for implementing client computer(s) 110 of FIG. 1. The user computers 805 can be general-purpose personal computers and/or can have any of a variety of applications, including one or more applications configured to perform methods of the invention, as well as one or more office applications, database client and/or server applications, and page renderer applications. Alternatively, the user computers 805 can be any other electronic device, such as a thin-client computer, Internet-enabled mobile telephone, tablet computer, phablet, wearable device, Internet-enabled appliance, and/or personal digital assistant (PDA) capable of communicating via a network (e.g., the network 810 described below) and/or displaying and navigating web pages or other types of electronic documents. Although the exemplary system 800 is shown with three user computers 805a-c, any number of user computers can be supported.

Certain embodiments of the invention operate in a networked environment, which can include a network 810, such as for implementing the network 140 of FIG. 1. The network 810 can be any type of network familiar to those skilled in the art that can support data communications using any of a variety of commercially-available protocols, including, without limitation, TCP/IP, UDP/IP, SNA, IPX, and the like. Merely by way of example, the network 810 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infrared network; a wireless network, including, without limitation, a network operating under any of the IEEE 802.11 suite of protocols, or any other wireless protocol; and/or any combination of these and/or other networks.

Embodiments of the invention can include one or more servers 815 (or similar types of computational systems). Embodiments of the servers 815 can be used to implement the content server(s) 120 and/or the hinting processor(s) 130. As described above, the hinting processor(s) 130 can also be part of one or more content servers 120, which can be implemented as one or more of the servers 815. Each of the servers 815 may be configured with an operating system, including, without limitation, any of those discussed above, as well as any commercially (or freely) available server operating systems. Each of the servers 815 may also be running one or more applications, which can be configured to provide services to one or more user computers 805 and/or other servers 815.

Merely by way of example, one of the servers 815 may be a web server, which can be used, merely by way of example, to process requests for web pages or other electronic documents from user computers 805. The web server can also run a variety of server applications, including HTTP servers, FTP servers, CGI servers, database servers, Java® 1 servers, and the like. In some embodiments of the invention, the web server may be configured to serve web pages that can be operated within a page renderer on one or more of the user computers 805 to perform methods of the invention. In certain embodiments, the servers 815 may also include CDN devices which provide similar or identical content from an alternate server than the primary content server which is a source for particular objects in a web page transaction.

The servers 815, in some embodiments, might include one or more application servers, which can include one or more applications accessible by a client running on one or more of the user computers 805 and/or other servers 815. Merely by way of example, the server(s) 815 can be one or more general-purpose computers capable of executing programs or scripts in response to the user computers 805 and/or other servers 815, including, without limitation, web applications (which might, in some cases, be configured to perform methods of the invention). Merely by way of example, a web application can be implemented as one or more scripts or programs written in any suitable programming language. The application server(s) can also include database servers which can process requests from clients (including, depending on the configurator, database clients, API clients, page renderers, etc.) running on a user computer 805 and/or another server 815. In some embodiments, an application server can create web pages dynamically for displaying the information in accordance with embodiments of the invention, such as information displayed as part of various page renderers discussed herein. Data provided by an application server may be formatted as web pages (comprising HTML, JavaScript®, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement methods of the invention incorporated by an application running on a user computer 805 and/or another server 815. Alternatively, as those skilled in the art will appreciate, a file server can include all necessary files, allowing such an application to be invoked remotely by a user computer 805 and/or server 815. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820, such as for storing hinting information 135, web pages 125 and/or page objects 127, and/or any other suitable data used by systems and methods of various embodiments. Such databases may include stores of web transaction history and hints derived from this web transaction history. Any supporting details related to creation of such hints may additionally be stored in such a database. The location of the database(s) 820 is discretionary: merely by way of example, a database 820a might reside on a storage medium local to (and/or resident in) a server 815a (and/or a user computer 805). Alternatively, a database 820b can be remote from any or all of the computers 805 or servers 815a,b, so long as the database 820b can be in communication with one or more of these (e.g., via the network 810). In a particular set of embodiments, a database 820 can reside in a storage-area network ("SAN") familiar to those skilled in the art. Likewise, any necessary files for performing the functions attributed to the computers 805 or servers 815 can be stored locally on the respective computer and/or remotely, as appropriate. In one set of embodiments, the database 820 can be a relational database that is adapted to store, update, and retrieve data in response to SQL-formatted commands. The database might be controlled and/or maintained by a database server, as described above, for example.

In any embodiment described herein, any communication, hypertext transport protocol (HTTP) request or response, web page transaction, portion of a web page transaction, or any combination of any communications in whole or in part that may use HTTP may also be implemented using hypertext transport protocol secure (HTTPS). The use of HTTPS involves encryption and various security measures, and any embodiment described herein may be adapted to implement systems and methods described herein to accommodate the encryption and security associated with HTTPS in a number of ways.

In certain embodiments, proxy devices involved in any communication described herein may be provided with details associated with HTTPS communications in order to enable any proxy device functionality described herein. Such details may be provided by a user device with user consent to enable proxy device or hinting server device interaction with the user's communications. This may enable decryption of HTTPS communication by the proxy to enable any functionality described herein. Such details to enable decryption may also be provided by a content server or content server operator to enable proxy device interaction with the content provider's communications. For aspects of embodiments described herein relating to client-side functionality or page renderer functionality, certain embodiments may function with the same implementation described above for proxy devices. This functionality may be used as well with any other server side or content device.

In other embodiments, rather than a proxy decryption of HTTPS communications, a browser on a user device may interact with a proxy device or a hinting server device independent of the original HTTPS communication to provide details of the HTTPS communication to the proxy device or hinting server device. In a user device page renderer, this may involve the use of a page renderer module, page renderer plug-in, or page renderer with specialized core functionality to observe HTTPS communications before they are encrypted. If needed, the independent communications with the proxy device or hinting server device may then additionally be subject to security similar to the security used for the original HTTPS communication. For embodiments described herein which may involve integration with content provider systems or reverse proxy systems, HTTPS communication received at the content provider system or reverse proxy may be used as part of the embodiments described herein after the HTTPS communication is decrypted by the content provider system or reverse proxy. Thus, any "observing" or "identifying" functionality described herein may be performed with HTTPS communications for client computers, proxy devices, and content provider devices. Similarly, any embodiment described herein may be implemented with other secure connection and communication systems or protocols in addition to HTTPS described above.

Certain embodiments described herein refer to proxy devices or proxy systems. As described herein, proxy devices may be one or more devices operating as part of a system to intercept communications between user devices and content devices. Such proxies may be transparent to the user and content devices, or may be part of a multi-step communication path which is apparent to user and content devices. In certain embodiments, proxy devices may function as part of a forward proxy system, where communications from a group of user devices are all communicated to a broader network (such as the Internet) via the forward proxy system. In alternate embodiments, the proxy devices may function as part of reverse proxy systems, where a reverse proxy system operates as an access path to a number of content server devices. It will be apparent that embodiments described herein as including a proxy will apply to both forward proxy systems and reverse proxy systems, and any configuration of a system including a proxy, given appropriate accommodations for the particular system structure.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The terms "one" or "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Fur-thermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alterna-tives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isola-tors, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. Similarly, terms, such as "optimize" are not intended to limit embodiments to an optimal approach or result, but rather to express seeking movement toward an optimal result (e.g., to improve, etc.). As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, meth-ods, and actions described above. Processes, machines, manufacture, compositions of matter, means, methods, or actions, presently existing or later to be developed, that perform substantially the same function or achieve substan-tially the same result as the corresponding aspects described herein can be utilized. Accordingly, the appended claims include within their scope such processes, machines, manu-facture, compositions of matter, means, methods, or actions.

What is claimed is:

1. A client page renderer of a client device configured to improve web page loading time in a communications net-work, the client page renderer comprising:
   a control module configured to manage requests and responses, over the communications network, for root objects and external child objects, associated with a web page, in conjunction with a first web page trans-action, the first web page transaction comprising a request for the web page, wherein the web page com-prises references to the external child objects;
   a parser configured to parse web objects received as part of the first web page transaction and to identify a feedback script received over the communications net-work; and
   a script executor configured to execute the feedback script received from the parser, execution of the feedback script configured to cause the control module to:
   gather feedback information regarding rendering of the web page associated with the first web page transac-tion, wherein the rendering of the web page obtains and uses a plurality of the external child objects associated with the web page; and
   provide the feedback information to a hinting service;
   wherein the control module is further configured to:
   receive, over the communications network from the hint-ing service, hinting information for speeding rendering of the web page or a related web page as part of a second web page transaction subsequent to the first web page transaction.

2. The client page renderer of claim 1, wherein the client page renderer is implemented as a web browser.

3. The client page renderer of claim 1, wherein the feedback script receives a child uniform resource locator and a rendering timing for each of the plurality of external child objects used in the rendering of the web page.

4. The client page renderer of claim 1, wherein the feedback script is included in a header of a root response of the first web page transaction.

5. The client page renderer of claim 1, wherein the feedback script is included in code of a web object that is part of a root response of the first web page transaction.

6. The client page renderer of claim 1, wherein the feedback script is received from a content server.

7. The client page renderer of claim 1, wherein the hinting service is provided by a content server.

8. The client page renderer of claim 1, wherein the hinting service is provided by a web server remote from the client device.

9. The client page renderer of claim 1, wherein the hinting service provides the feedback script.

10. The client page renderer of claim 1, wherein the control module is further configured to initiate the second web page transaction with which the web page or the related web page is associated.

11. The client page renderer of claim 1, wherein the feedback information includes one or more timings associ-ated with one or more actions in the rendering of the web page.

12. The client page renderer of claim 1, wherein the feedback information includes one or more render times for one or more actions in the rendering of the web page.

13. The client page renderer of claim 1, wherein the feedback information includes a render time for one or more of the plurality of external child objects used in rendering the web page.

14. The client page renderer of claim 1, wherein the feedback information further includes information regarding a relative importance of at least one of the plurality of external child objects used in the rendering of the web page.

15. The client page renderer of claim 14, wherein the relative importance corresponds to a contribution of the at least one of the plurality of external child objects to an overall render time of the web page.

16. The client page renderer of claim 1, wherein the feedback information identifies at least one of the plurality of external child objects used in the rendering of the web page.

17. The client page renderer of claim 16, wherein the feedback information indicates a size of the at least one external child object identified in the feedback information as having been used in the rendering of the web page.

18. The client page renderer of claim 16, wherein the feedback information includes a render time of the at least one external child object identified in the feedback information as having been used in the rendering of the web page.

19. The client page renderer of claim 18, wherein the hinting information identifies for prefetching one of the at least one external child object identified in the feedback information having a greatest render time.

20. The client page renderer of claim 19, wherein the hinting information identifies the one of the at least one external child object having the greatest render time for prioritized prefetching.

21. The client page renderer of claim 18, wherein the feedback information further includes a render time of the web page.

22. The client page renderer of claim 16, wherein the feedback information identifies as a primary child object in the rendering of the web page one of the at least one external child object identified in the feedback information as having been used in the rendering of the web page.

23. The client page renderer of claim 22, wherein the hinting information identifies the primary child object for prefetching.

24. The client page renderer of claim 22, wherein the hinting information identifies the primary child object for prioritized prefetching.

25. The client page renderer of claim 16, wherein the feedback information identifies:

a plurality of the external child objects used in the rendering of the web page, and an order in which at least two of the plurality of external child objects were used.

26. The client page renderer of claim 25, wherein the hinting information:

identifies for prefetching two or more of the external child objects identified in the feedback information as used in the rendering of the web page, and indicates to prefetch in accordance with the use order identified in the feedback information.

27. The client page renderer of claim 16, wherein feedback information identifies:

a plurality of the external child objects used in the rendering of the web page, and a dependency of one of the plurality of external child objects on another of the plurality of external child objects.

28. The client page renderer of claim 27, wherein the hinting information:

identifies for prefetching two or more of the plurality of external child objects identified in the feedback information as used in the rendering of the web page, and indicates to prefetch in accordance with the dependency identified in the feedback information.

29. The client page renderer of claim 16, wherein the feedback information further identifies one of the plurality of external child objects used in the rendering of the web page as having a greatest render time in the rendering of the web page.

30. The client page renderer of claim 29, wherein the hinting information identifies the one of the plurality of external child objects having the greatest rendering time for prefetching.

31. The client page renderer of claim 29, wherein the hinting information identifies the one of the plurality of external child objects having the greatest rendering time for prioritized prefetching.

32. The client page renderer of claim 16, wherein the hinting information identifies for prefetching one or more of the at least one external child object identified in the feedback information as used in the rendering of the web page.

33. The client page renderer of claim 16, wherein the hinting information identifies for prefetching a largest one of the at least one external child object identified in the feedback information.

34. The client page renderer of claim 33, wherein the hinting information identifies the largest one of the at least one external child object for prioritized prefetching.

35. The client page renderer of claim 16, wherein the at least one external child object identified in the feedback information as having been used in the rendering of the web page comprises a cascaded style sheet.

36. The client page renderer of claim 35, wherein the hinting information identifies the cascaded style sheet for prefetching.

37. The client page renderer of claim 35, wherein the feedback information indicates a render time of the cascaded style sheet in the rendering of the web page.

38. The client page renderer of claim 37, wherein the feedback information indicates a time that processing the cascaded style sheet contributed to an overall rendering time of the web page.

39. The client page renderer of claim 1, wherein a portion of the hinting information correlates to a portion of the feedback information.

40. The client page renderer of claim 1, wherein:

the feedback information further includes an indication of an impact that one or more of the plurality of external child objects used in the rendering of the web page had on an overall render time of the web page, and the hinting information indicates a priority for prefetching at least one of the plurality of external child objects used in the rendering of the web page in accordance with the indicated impact on the overall render time of the web page.

41. The client page renderer of claim 1, wherein:

the feedback information identifies one of the external child objects used in the rendering of the web page as being most impactful on the rendering of the web page, and the hinting information identifies the most impactful child object for prefetching.

42. The client page renderer of claim 1, wherein the control module is further configured to:

receive the web page, as part of the first web page transaction, from a first web server, and receive, as part of the first web page transaction, at least one of the plurality of external child objects used in the rendering of the web page from a second web server different than the first web server, wherein the hinting information identifies the second web server for pre-connecting as part of the second web page transaction.

43. The client page renderer of claim 42, wherein the feedback information identifies the second web server as a source of at least one of the plurality of external child objects used in the rendering of the web page.

44. The client page renderer of claim 1 further comprising:

a fetcher, wherein the hinting information identifies one or more of the plurality of external child objects and the fetcher is configured to, as part of the second web page transaction, prefetch the one or more external child objects identified in the hinting information; and a page renderer configured to render the web page or the related web page using one or more of the prefetched external child objects;

wherein the control module is further configured to receive the web page or the related web page.

* * * * *